(12) United States Patent
Nishino et al.

(10) Patent No.: US 9,244,316 B2
(45) Date of Patent: Jan. 26, 2016

(54) DISPLAY DEVICE

(75) Inventors: Tomonori Nishino, Mobara (JP); Syou Yanagisawa, Mobara (JP); Masanari Saitou, Mobara (JP); Yoshinori Aoki, Mobara (JP); Nobuyuki Ishige, Shirako (JP)

(73) Assignee: JAPAN DISPLAY INC., Tokyo (JP)

( * ) Notice: Subject to any disclaimer, the term of this patent is extended or adjusted under 35 U.S.C. 154(b) by 233 days.

(21) Appl. No.: 13/609,314

(22) Filed: Sep. 11, 2012

(65) Prior Publication Data

US 2013/0063406 A1 Mar. 14, 2013

(30) Foreign Application Priority Data

Sep. 12, 2011 (JP) ................. 2011-198130

(51) Int. Cl.
*G02F 1/1345* (2006.01)
(52) U.S. Cl.
CPC .................... *G02F 1/1345* (2013.01)
(58) Field of Classification Search
CPC .................................................. G02F 1/1345
See application file for complete search history.

(56) References Cited

U.S. PATENT DOCUMENTS

| 8,415,881 B2 * | 4/2013 | Satake ........................... 313/512 |
| 2002/0104995 A1 * | 8/2002 | Yamazaki et al. ............. 257/72 |
| 2011/0170274 A1 * | 7/2011 | Moriwaki ..................... 361/783 |

FOREIGN PATENT DOCUMENTS

| CN | 101847639 | 9/2010 |
| JP | 2005-529360 A | 9/2005 |
| JP | 2005-275054 A | 10/2005 |
| JP | 2006-209089 A | 8/2006 |
| JP | 2007-272255 | 10/2007 |

OTHER PUBLICATIONS

Communication issued in connection with Chinese Patent Application No. 201210341290.7, dated Sep. 23, 2014.
Office Action dated Mar. 17, 2015 regarding a counterpart Japanese patent application No. 2011-198130, citing the above reference(s).

* cited by examiner

*Primary Examiner* — Kenneth B Lee, Jr.
(74) *Attorney, Agent, or Firm* — Lowe Hauptman & Ham, LLP

(57) ABSTRACT

An illuminating device includes: a light source; a light guide plate which converts light emitted from the light source into a surface light ray and emits the surface light ray through a front surface of the light guide plate; and an optical sheet which changes a propagation direction of the surface light ray emitted from the light guide plate. The light source is arranged in opposition to one end surface of the light guide plate. A polarization state converting structure to convert a polarization state of the light propagating through the light guide plate is provided in a rear surface of the light guide plate. The polarization state converting structure contains an inclination plane having a ridge line extending in a direction perpendicular to the extension direction of the one end surface.

14 Claims, 16 Drawing Sheets

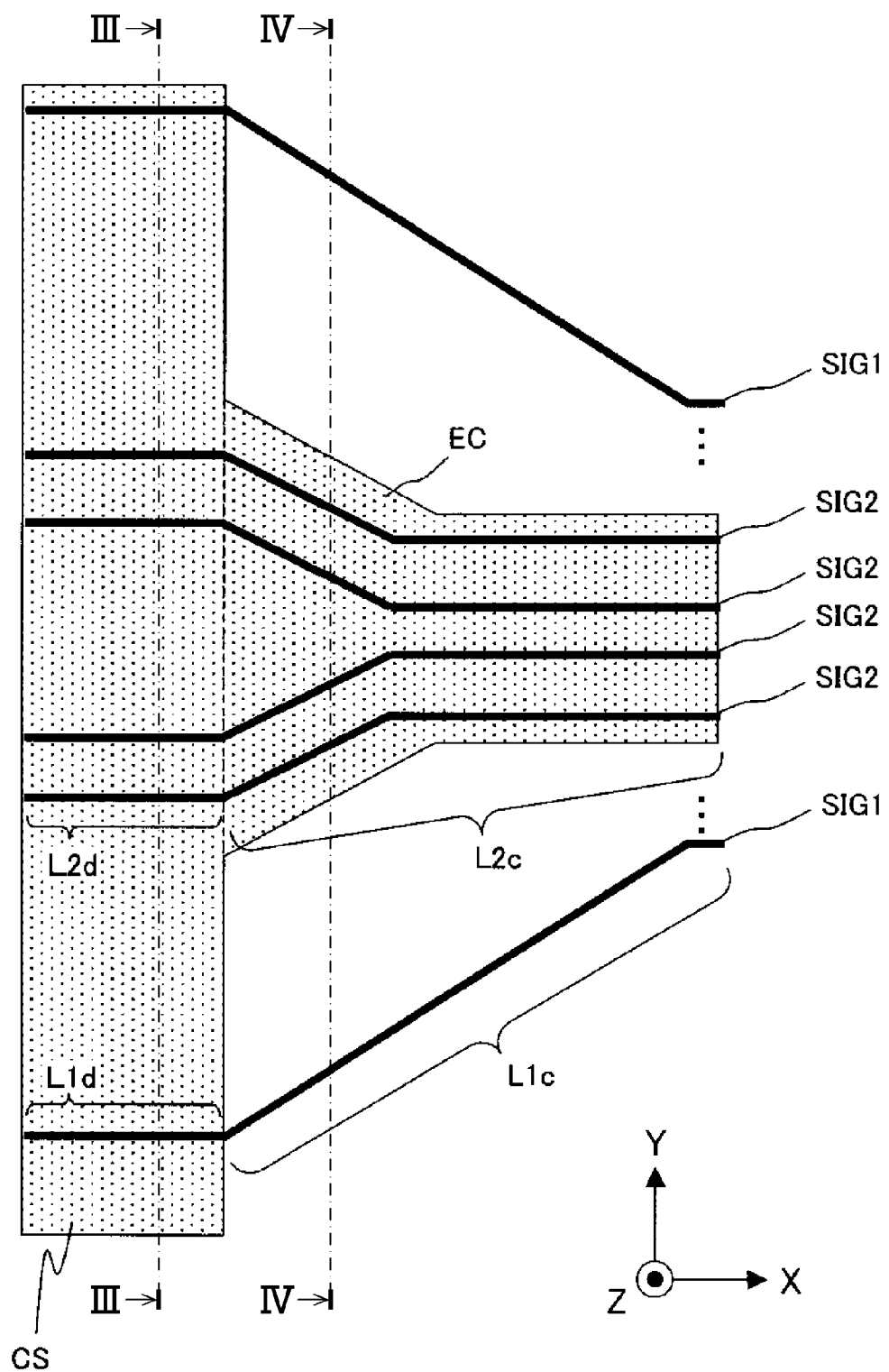

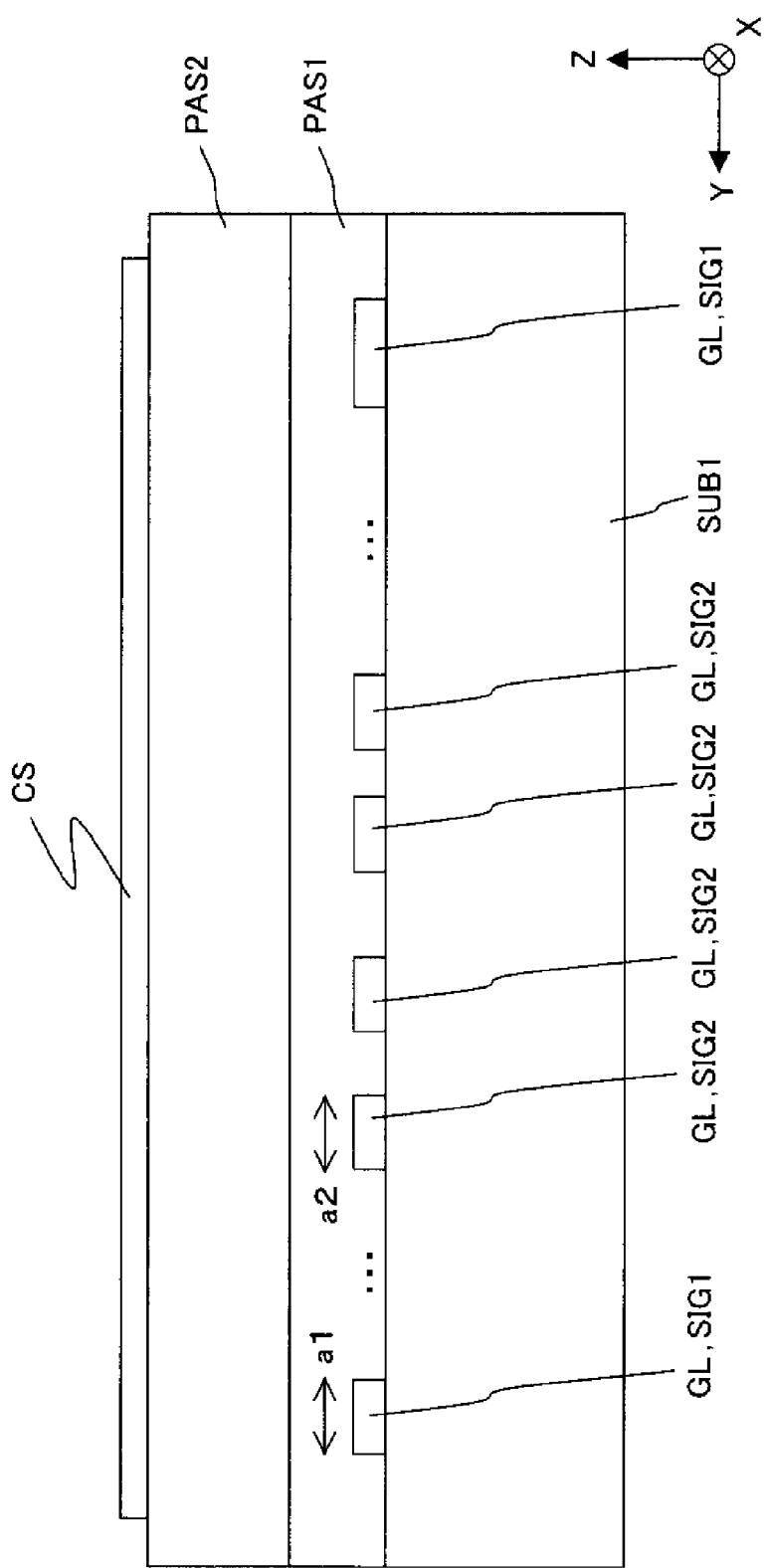

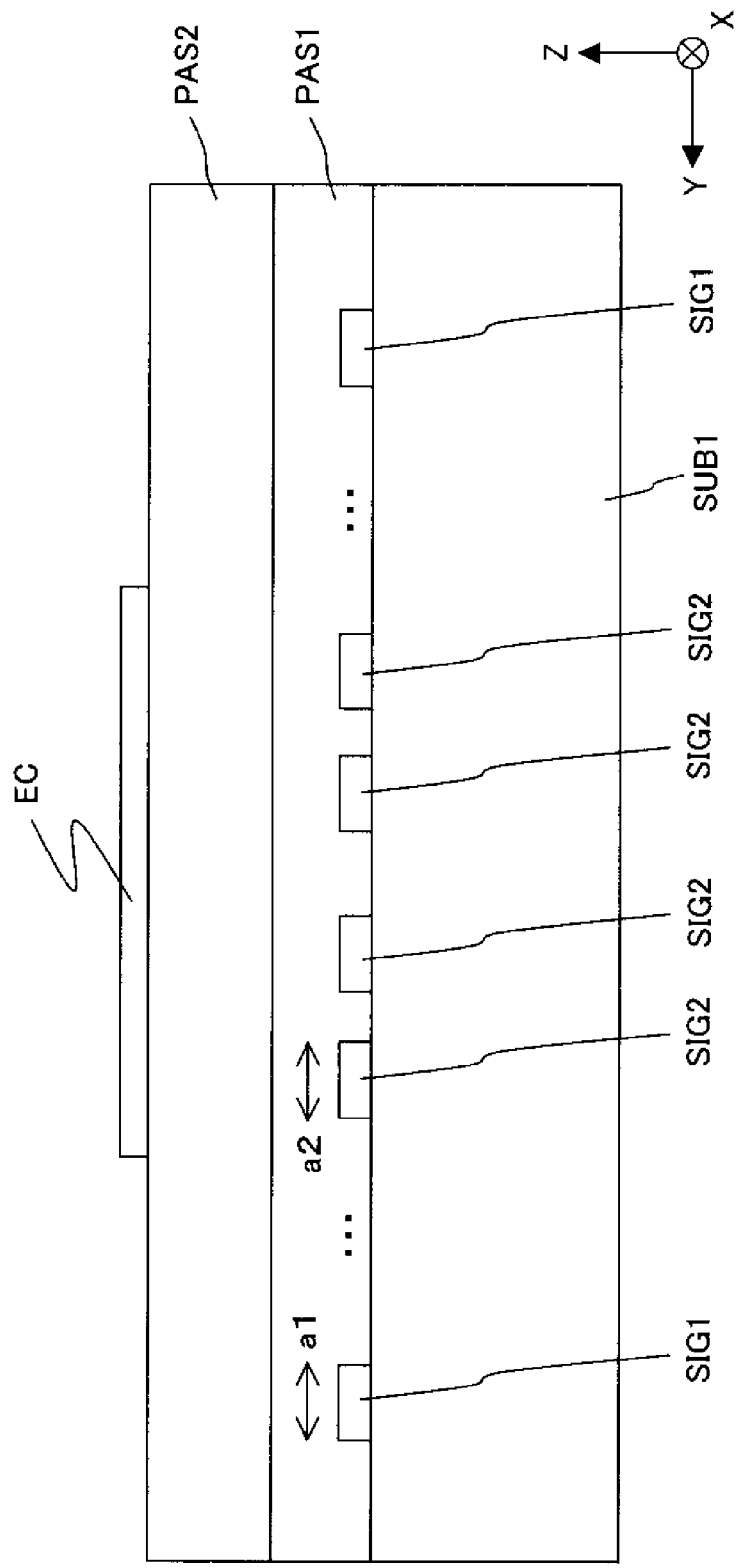

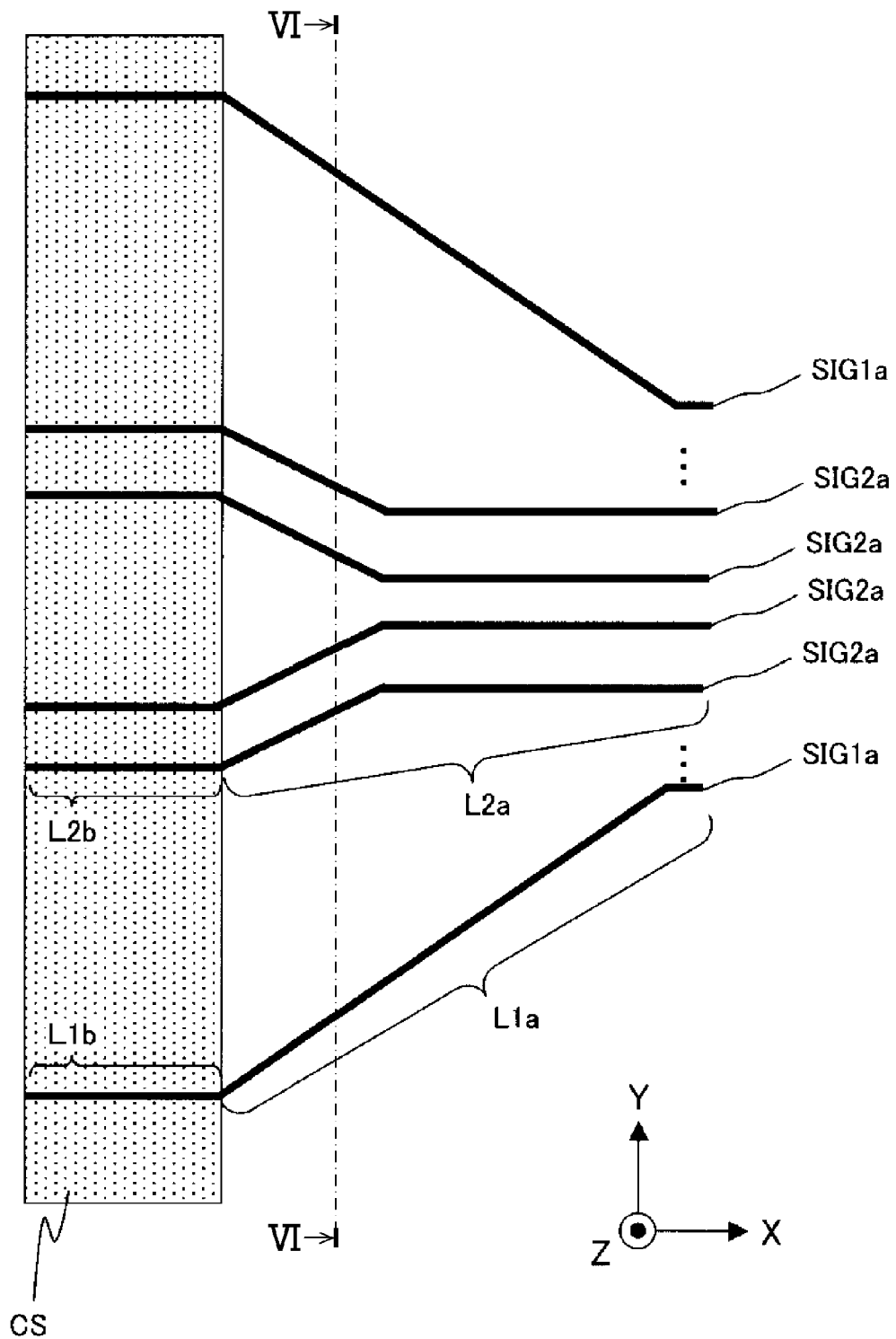

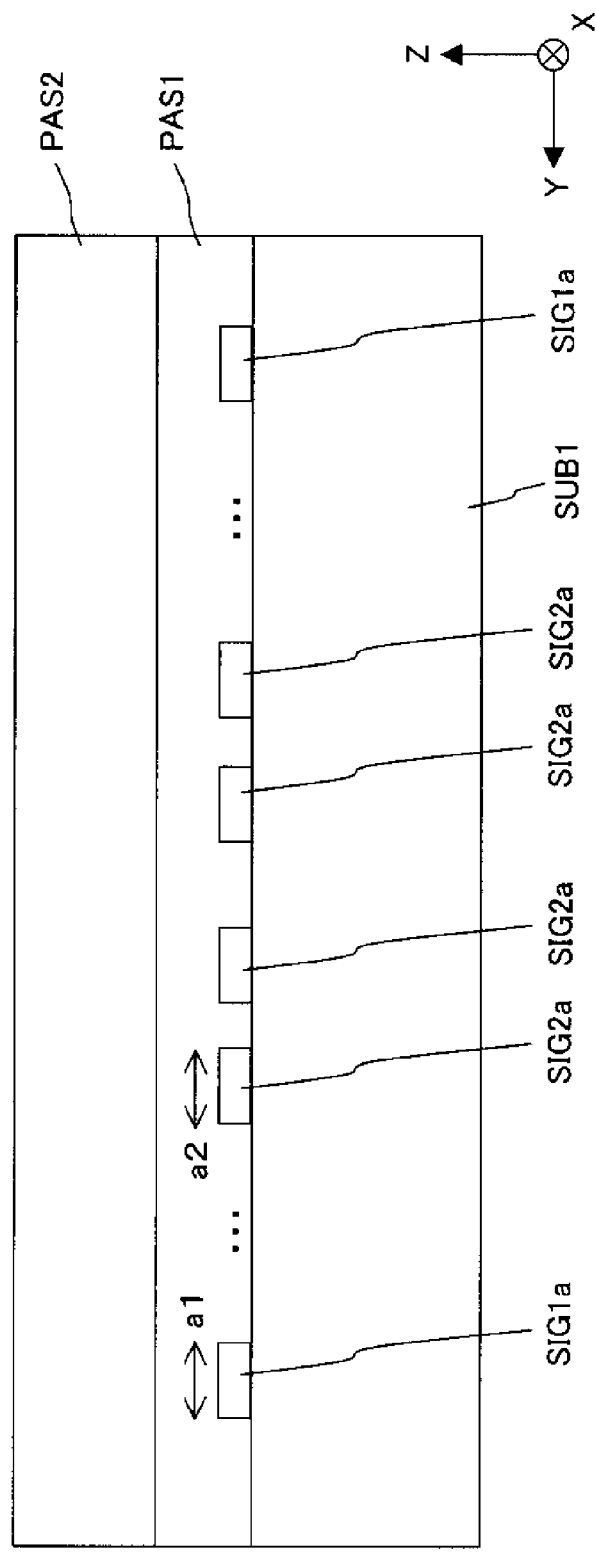

DISPLAY DEVICE

CROSS-REFERENCE TO RELATED APPLICATION

The present application claims priority from Japanese application JP2011-198130 filed on Sep. 12, 2011, the content of which is hereby incorporated by reference into this application.

BACKGROUND OF THE INVENTION

1. Field of the Invention

The present invention relates to a display device, and more particularly to a lead line formed on a peripheral portion of a display area.

2. Description of the Related Art

In a related-art liquid crystal display device, a plurality of video signal lines that supply a video signal, and a plurality of scanning signal lines that are so formed as to intersect with the video signal lines to supply a scanning signal are formed on a liquid crystal surface side of one transparent substrate of a pair of transparent substrates which are opposed to each other through a liquid crystal, layer. A plurality of pixels are formed respectively in an area surrounded by the video signal lines and the scanning signal lines. A video signal driver circuit that supplies the video signal, and a scanning signal driver circuit that supplies the scanning signal are arranged in a peripheral portion of a display area in which the plurality of pixels are formed. Signal lines called "lead lines", which are formed in the peripheral portion of the display area, are electrically connected between the video signal lines and the video signal driver circuit, and between the scanning signal lines and the scanning signal driver circuit, to supply the video signals and the scanning signals to the respective pixels.

Also, there is a liquid crystal display device configured such that a connection terminal portion is formed in a side portion of the transparent substrate, the connection terminal portion and the lead lines are electrically connected to each other, and the scanning signals and the video signals are supplied from an external of the transparent substrate through the connection terminal portion. As the liquid crystal display device thus configured, there is a liquid crystal display device disclosed in, for example, JP 2007-272255 A. The liquid crystal display device disclosed in JP 2007-272255 A is configured such that a conductive layer is formed over an upper layer of the lead lines through an insulating film so as to cover an overall surface of an area between the display area and the connection terminal portion, which is an area in which the lead lines from the scanning signal lines are formed, and a potential fluctuation given to the transparent substrates opposed to each other by an electric field from the lead lines is suppressed by the conductive layer.

SUMMARY OF THE INVENTION

In rewrite of a display image in the liquid crystal display device, voltages held in the respective pixels are sequentially rewritten to voltages to be output to the video signal lines in synchronism with the scanning signals, for each of pixel rows arrayed in parallel to a first direction. In this case, in order to accurately write the video signals to the pixels connected to the same scanning signal line, the output of the video signals to the video signal lines is synchronized with the output of the scanning signals to the scanning signal lines.

However, the liquid crystal display device disclosed in JP 2007-272255 A is configured such that the plurality of scanning signal lines and the plurality of video signal lines are arrayed in parallel from one end side to the other end side within the display area. For that reason, the lead lines are formed to be shorter in an area where positions at which the scanning signal lines or the video signal lines are formed are closer to a position at which the driver circuit is mounted, and the lead lines are formed to be longer in an area where the former is farther from the latter. On the other hand, if wiring lengths of the lead lines are different from each other, a wiring resistance and a parasitic capacitance are also larger in proportion to the wiring length. For that reason, even if the respective video signals and scanning signals are output from the driver circuit in synchronization, a signal delay corresponding to the wiring length of each lead line occurs. This can cause a signal delay to occur even in the video signals output to the video signal lines and the scanning signals output to the scanning signal lines. The signal delay remarkably influences the area in which the wiring length of the lead lines is longer, and the uneven brightness or the like occurs.

In order to prevent the signal delay associated with the difference in the wiring length of the lead lines, in the related-art liquid crystal display device, curvature is provided in the lead lines to increase the wiring length in the area where the positions at which the scanning signal lines or the video signal lines are formed are closer to the position at which the driver, circuit is mounted, and a difference in the wiring length from the lead lines in the area where the former is farther from the latter becomes smaller.

On the other hand, with the higher definition in the recent years, the scanning signal lines and the video signal lines increase in number, and with the narrower frame, the wiring widths and the wiring areas of the scanning signal lines and the video signal lines become smaller. This makes it difficult to provide the lead lines with curvature, and to form the curvature having a sufficient wiring length depending on the precision of an exposure device. For that reason, there is desired a method of solving the uneven brightness caused by the signal delay associated with the difference in the wiring length of the lead lines.

The present invention has been made in view of those problems, and an object of the present invention is to provide a display device that can prevent the occurrence of the uneven brightness caused by a difference in the wiring length of the lead lines.

(1) In order to solve the above problems, according to the present invention, there is provided a display device having a plurality of scanning signal lines that extend in an X-direction and are arrayed in parallel to a Y-direction, and a plurality of video signal lines that extend in the Y-direction and are arrayed in parallel to the X-direction, in which an area of one pixel is configured by an area surrounded by the two adjacent scanning signal lines and two adjacent video signal lines, and a plurality of pixels are arrayed in a matrix within a display area, along the scanning signal lines and the video signal lines, the display device including: lead lines that extend from the display area, and electrically connect the video signal lines or the scanning signal lines within the display area, and a driver circuit or a terminal portion that receives an output from the driver circuit; an insulating film that is formed in an upper layer of the lead lines and covers the lead lines; and a conductive film that is formed in an upper layer of the insulating film, wherein the lead lines include a plurality of first lead lines that start from the driver circuit or the terminal portion, and arrive at the scanning signal lines or the video signal lines, and a plurality of second lead lines that are smaller in wiring resistance than the first lead lines, and wherein at least the first lead lines overlap with the conductive film through the insulating film.

(2) In order to solve the above problems, according to the present invention, there is provided a display device having a plurality of scanning signal lines that extend in an X-direction and are arrayed in parallel to a Y-direction, and a plurality of video signal lines that extend in the Y-direction and are arrayed in parallel to the X-direction, in which an area of one pixel is configured by an area surrounded by the two adjacent scanning signal lines and two adjacent video signal lines, and a plurality of pixels are arrayed in a matrix within a display area, along the scanning signal lines and the video signal lines, the display device including: lead lines that extend from the display area, and electrically connect the video signal lines or the scanning signal lines within the display area, and a driver circuit or a terminal portion that receives an output from the driver circuit; an insulating film that is formed in an upper layer of the lead lines and covers the lead lines; and a conductive film that is formed in an upper layer of the insulating film, wherein the lead lines include a first lead line that overlaps with the conductive film through the insulating film, and a second lead line that does not overlap with the conductive film, and wherein a wiring resistance of the first lead line extending from the driver circuit or the terminal portion to the scanning signal line or the video signal line is smaller than a wiring resistance of the second lead line.

According to the present invention, the occurrence of the uneven brightness caused by a difference in the wiring length of the lead lines can be prevented.

The other advantages of the present invention will become apparent from the description of the overall specification.

BRIEF DESCRIPTION OF THE DRAWINGS

FIG. 2 is an enlarged view of a peripheral portion in the liquid crystal display device according to the first embodiment of the present invention;

FIG. 3 is a cross-sectional view taken along a line illustrated in FIG. 2;

FIG. 4 is a cross-sectional view taken along a line IV-IV illustrated in FIG. 2;

FIG. 5 is a diagram illustrating lead lines in a peripheral portion in a related-art liquid crystal display device;

FIG. 6 is a cross-sectional view taken along a line VI-VI illustrated in FIG. 5;

DETAILED DESCRIPTION OF THE INVENTION

Figure 1A:
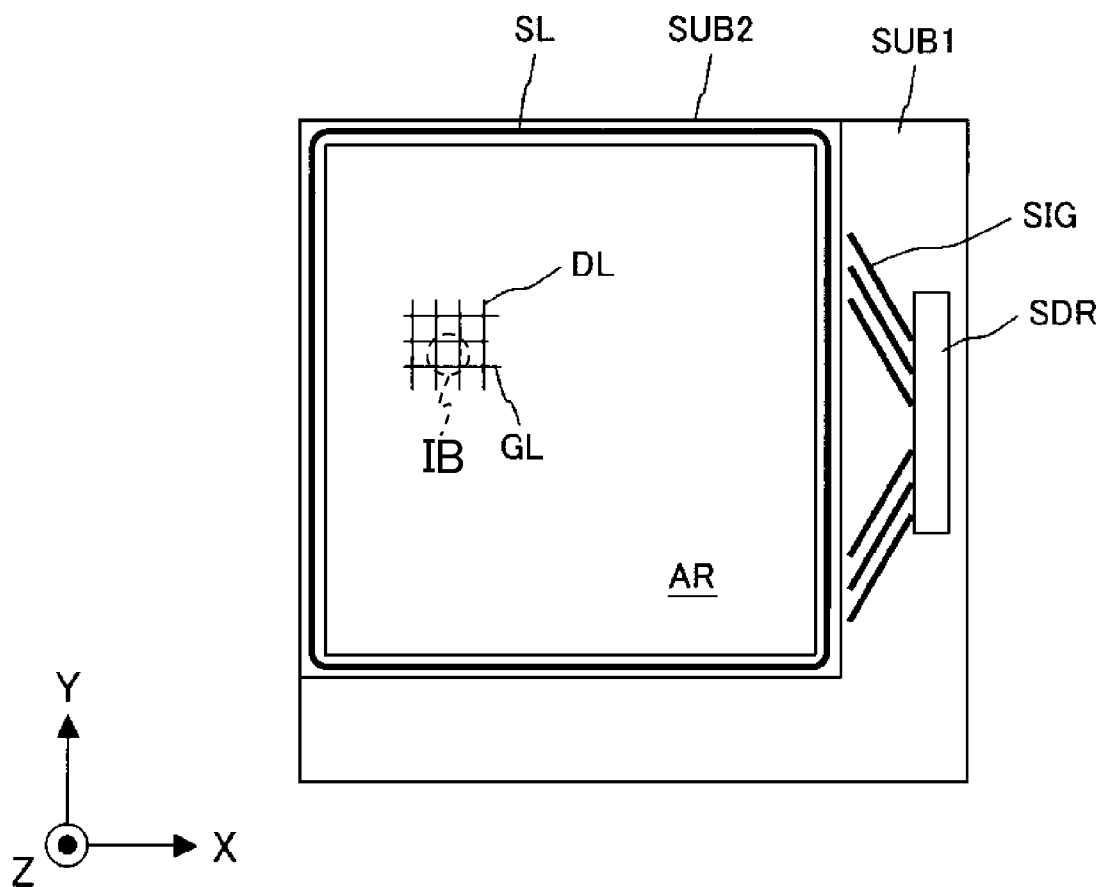
FIG. 1A is a diagram illustrating an outline configuration of a liquid crystal display device which is a display device according to a first embodiment of the present invention.

Hereinafter, embodiments according to the present invention will be described with reference to the accompanying drawings. In the following description, the same constituent components are denoted by identical reference numerals or symbols, and repetitive description will be omitted. Also, X, Y, and Z represent an X-axis, a Y-axis, and a Z-axis, respectively.

[First Embodiment]
(Overall Configuration)

FIG. 1A is a diagram illustrating an outline configuration of a liquid crystal display device which is a display device according to a first embodiment of the present invention. Hereinafter, a description will be given of an overall configuration of a liquid crystal display device according to the first embodiment with reference to FIG. 1A. In the following description, the present invention is applied to the liquid crystal display device using a liquid crystal display panel of an IPS (in-plane switching) system. However, the present invention can be applied to a liquid crystal display panel of a TN (twisted nematic) system, a VA (vertical alignment) system or the like. Further, the display panel that conducts image display is not limited to a non-emissive type liquid crystal display panel, but can be also applied to another non-emissive type display panel, or an emissive type display panel such as an organic EL display panel or a plasma display panel. Also, for simplification of description, an oriented film formed on a liquid crystal surface side of a first substrate SUB1, polarizing plates arranged on outer surfaces of the first substrate SUM and a second substrate SUB2 and the like will be omitted.

As illustrated in FIG. 1A, the liquid crystal display device according to the first embodiment includes a liquid crystal display panel having the first substrate SUB1 on which pixel electrodes PX, thin film transistors TFT and the like are formed, a second substrate SUB2 which is opposed to the first substrate SUB1, and on which color filters and the like are formed, and a liquid crystal layer sandwiched between the first substrate SUB1 and the second substrate SUB2. Also, the liquid crystal display device is configured by the combination of the liquid crystal display panel with a backlight unit (backlight device) not shown which is a light source. The fixation of the first substrate SUB1 and the second substrate SUB2, and the sealing of liquid crystal are conducted by a seal material SL annularly coated on a peripheral portion of the second substrate, thereby sealing the liquid crystal. In the liquid crystal display device according to the first embodiment, an area in which display pixels (hereinafter abbreviated as "pixels") are formed, within an area in which the liquid crystal is sealed, forms a display area AR. Accordingly, the area having no pixels formed and not related to display even within the area in which the liquid crystal is sealed does not form the display area AR.

Also, the second substrate SUB2 is smaller in area than the first substrate SUB1, and a lower side portion and a right side portion (side edge portions) of the first substrate SUB1 in the figure are exposed. A scanning signal driver circuit (gate driver) SDR that is formed of a semiconductor chip and generates scanning signals is mounted on the right side portion of the first substrate SUB1 in the figure. Also, a video signal driver circuit (drain driver) not shown which is formed of a semiconductor chip and generates video signals is mounted on the lower side portion of the first substrate SUB1 in the figure. The scanning signal driver circuit SDR and the video signal driver circuit drive the respective pixels arranged in the display area AR. In the following description, the liquid crystal display panel may be also called the liquid crystal display device. Also, the first substrate SUB1 and the second substrate SUB2 are generally each formed of, for example, a known glass substrate as a base material, but may be each formed of a resin transparent insulating substrate.

In the liquid crystal display device according to the first embodiment, on a liquid crystal side surface of the first substrate SUB1 within the display area AR, there are formed scanning signal lines (gate lines) GL that extend in an X-direction and are arrayed in parallel to a Y-direction in FIG. 1A, and receive the scanning signals from the scanning signal driver circuit SDR. Also, there are formed video signal lines (drain line) DL that extend in the Y-direction and are arrayed in parallel to the X-direction in FIG. 1A, and receive the video signals (gradation signals) from the video signal driver circuit not shown. An area surrounded by two adjacent drain lines DL and two adjacent gate lines GL configures each pixel, and a plurality of pixels are arrayed in a matrix within the display area. AR, along the drain lines DL and the gate lines GL.

Figure 1B:
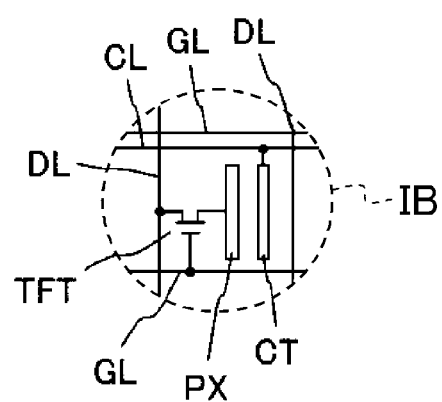
FIG. 1B is an equivalent circuit diagram of a dashed frame IB in FIG. 1A.

For example, as illustrated in FIG. 1B which is an equivalent circuit diagram of a portion within a dashed frame IB in FIG. 1A, each of the pixels includes a thin film transistor TFT that is driven in on/off according to the scanning signal from the gate line GL, a pixel electrode PX to which the video signal is supplied from the drain line DL through the thin film transistor TFT that has turned on, and a common electrode CT to which a common signal having a reference potential for a potential of the video signal is supplied through a common line CL. In the equivalent circuit diagram illustrated in FIG. 1B, the pixel electrode PX and the common electrode CT are schematically linearly shown. However, any one electrode of the pixel electrode PX and the common electrode CT in the first embodiment is shaped into a plate, and the other electrode arrayed on the liquid crystal surface side through the one electrode and the insulating film is formed linearly (or in a pectinate shape) in a overlapping area. An electric field having a component parallel to a main surface of the first substrate SUB1 is developed between the pixel electrode PX and the common electrode CT, and liquid crystal molecules are driven by the electric field. In this situation, in the liquid crystal display device according to the first embodiment, display is conducted in a normally black display form in which when no electric field is applied to the liquid crystal, an optical transmittance is minimized (black indication), and the optical transmittance is improved by application of the electric field. The thin film transistor TFT according to the first embodiment is driven so that a drain electrode and a source electrode are replaced with each other by application of a bias. In the present specification, for convenience, a side connected to the drain line DL is referred to as the drain electrode, and a side connected to the pixel electrode PX is referred to as the source electrode.

Each drain line DL and each gate line GL extend over the display area AR at end portions thereof, and are connected to the scanning signal driver circuit SDR that generates the scanning signals or the video signal driver circuit that generates the video signals, respectively. In the liquid crystal display device according to the first embodiment, the scanning signal driver circuit SDR and the video signal driver circuit are each formed of a semiconductor chip, and mounted on the first substrate SUB1. Alternatively, any one or both of the video signal driver circuit that outputs the video signals and the scanning signal driver circuit that outputs the scanning signals may be mounted on a flexible printed board FPC in a tape carrier system or a COF (chip on film) system, and the video signals and the scanning signals may be input through a terminal portion formed on the first substrate SUB1.

[Detailed Configuration of Lead Lines]

FIG. 2 is an enlarged view of a peripheral portion in the liquid crystal display device according to the first embodiment of the present invention, FIG. 3 is a cross-sectional view taken along a line illustrated in FIG. 2, and FIG. 4 is a cross-sectional view taken along a line IV-IV illustrated in FIG. 2. In the following description, in order to clarify the signal lines that function as the drain lines DL and the gate lines GL arrayed within the display area AR, and the signal lines that extend to the peripheral portion of the display area AR over the display area AR and the seal material SL, and reach the scanning signal driver circuit SDR and the video signal driver circuit, the signal lines arrayed within the display area AR and the signal lines formed in an area overlapping with a shield electrode CS are referred to as the drain lines DL and the gate lines GL, and the signal lines formed in the peripheral portion of the display area AR, that is, an area closer to the side edge portion of the first substrate SUB1 than the shield electrode CS are referred to as lead lines SIG.

As illustrated in FIG. 3, in the display area AR and the area close to the display area AR, the gate lines GL extending in the X-direction are arrayed in parallel to the Y-direction, on the liquid crystal surface side (upper side in FIG. 3) of the first substrate SUB1. In an upper layer thereof is formed an insulating film PAS1 made of, for example, silicon nitride (SiN) so as to cover an overall surface of the first substrate SUB1 including the gate lines GL. The insulating film PAS1 functions as a gate insulating film, in an area where the thin film transistors TFT are formed. On the liquid crystal surface side of the insulating film PAS1 is formed an insulating film PAS2 so as to cover the insulating film PAS1. The insulating film PAS2 is so formed as to cover an overall surface of the insulating film PAS1 together with the drain electrodes and the source electrodes of the thin film transistors TFT, the drain lines DL, and pixel electrodes PX electrically connected to the source electrodes. On an upper layer of the insulating film PAS2 is formed the shield electrode (common shield) CS formed of a transparent conductive film for preventing an electric field leakage from the common electrodes CT and the display area AR. In the first embodiment, the shield electrode CS is formed in the same process as that of the linear common electrode CT which is opposed to the pixel electrodes PX not shown through the insulating film PAS2, and also electrically connected to the common electrodes CT. Accordingly, the common signals are also supplied to the shield electrodes CS as with the common electrodes CT. The shield electrodes CS may not be electrically connected to the common electrodes CT. In this case, a constant voltage such as a supply voltage or a ground voltage may be supplied to the shield electrode CS.

Also, as illustrated in FIG. 2, in the liquid crystal display device according to the first embodiment, the lead lines SIG extending from the gate lines GL within the display area AR to the peripheral portion are classified into two groups of lead lines SIG2 close to the scanning signal driver circuit SDR and lead lines SIG1 far therefrom. That is, in the first embodiment, the scanning signal driver circuit SDR is mounted on the side portion in the extension direction (X-direction) of the gate lines GL, and mounted on the center portion in the array direction (Y-direction) of the gate lines GL. Accordingly, in the first embodiment, in the parallel array direction (Y-direction) of the gate lines GL, the lead lines SIG are classified into the lead lines SIG1 each having a relatively long wiring length because the lead lines SIG1 are extended from the gate lines GL arrayed in parallel in the side edge portion of the display area AR, that is, at a position far from the center portion, and the lead lines SIG2 each, having the wiring length relatively shorter than the lead lines SIG1, which are extended from the gate lines GL close to the center portion of the parallel array position of the gate lines GL.

As described in an item of the advantages to be described later, in the related-art configuration of the lead lines, the wiring resistance and the parasitic capacitance become larger in proportion to the wiring length. For that reason, the scanning signals of the gate lines GL connected to the lead lines each having the longer wiring length are delayed as compared with the lead lines each having the shorter wiring length.

On the contrary, in the configuration of the lead lines SIG1 and SIG2 according to the first embodiment, a conductive film (transparent conductive film) EC that extends from the shield electrode CS is disposed only in the area where the lead lines SIG2 each having the short wiring length are formed. In this case, as illustrated in FIG. 4, only the lead lines SIG2 overlap with the conductive film EC through the insulating films PAS1 and PAS2, that is, only the lead lines SIG2 overlap with the conductive film EC when viewed in a plane. With this configuration, capacitive elements are formed between the respective lead lines SIG2 and the conductive film EC. As a result, in the lead lines SIG2, a delay time occurs in the scanning signals output from the scanning signal driver circuit SDR according to only the wiring resistance, the floating capacitance, and the capacitive elements between the respective lead lines SIG2 and the conductive film EC.

On the other hand, since no conductive film EC is formed in an upper layer of the lead lines SIG1, a delay of the scanning signals in the lead lines SIG1 is determined according to the wiring resistance and the floating capacitance of the lead lines SIG1. That is, in the liquid crystal display device according to the first embodiment, the capacitive elements are formed so that the delay time of the scanning signals in the lead lines SIG2 becomes larger than the signal delay time in the lead lines SIG1 which are the lead lines each having the longer wiring length. For the purpose of forming the capacitive elements to generate the signal delay in the lead lines SIG2, the conductive film EC is formed only in the area that is superposed on the lead lines SIG2 within the peripheral portion of the display area AR.

In this case, as described in the following item of the description of advantages, the lead lines SIG2 are larger in the capacitance than the lead lines SIG1. Accordingly, a difference between a delay time T1 of the lead lines SIG1, and a delay time T2 of the lead lines SIG2, which are calculated by a product of the wiring capacitance and the wiring resistance, can be reduced. As a result, since a delay time difference T=T2−T1 in the lead lines SIG1 and SIG2 different in the wiring length can be reduced, the uneven brightness caused by the signal delay associated with the difference in the wiring length of the lead lines SIG can be remarkably suppressed, and the display quality of the liquid crystal display device can be improved.

[Description of Advantages]

FIG. 5 is a diagram illustrating the lead lines in the peripheral portion in the related-art liquid crystal display device, and FIG. 6 is a cross-sectional view taken along a line VI-VI illustrated in FIG. 5. A description will be given of the signal delay in the related-art lead lines SIG and the lead lines SIG1 and SIG2 in the first embodiment. In the following description, for the purpose of clarifying the lead lines SIG1 and SIG2 in the first embodiment, and the lead lines SIG1 and SIG2 in the related-art liquid crystal display device, the lead lines SIG each having the longer wiring length are referred to as lead lines SIG1$a$, and the lead lines SIG each having the shorter wiring length are referred to as lead lines SIG2$a$, in the related-art liquid crystal display device.

As illustrated in FIG. 5, the pixel configuration and the configuration of the gate lines GL in the display area AR of the related-art liquid crystal display device are identical with those in the first embodiment, and the gate lines GL overlap with the display area AR not shown and the shield electrode CS formed in the vicinity of the display area AR. Also, the lead lines SIG1$a$ and SIG2$a$ are extended from the gate lines GL, and end portions thereof are electrically connected to the scanning signal driver circuit SDR not shown. As in the first embodiment, the lead lines SIG each having the longer wiring length are referred to as the lead lines SIG1$a$, and the lead lines SIG each having the shorter wiring length are referred to as the lead lines SIG2$a$.

Also, as illustrated in FIG. 6, in the related-art liquid crystal display device, the lead lines SIG1$a$ and SIG2$a$ extending from the gate lines GL are covered with the insulating films PAS1 and PAS2. That is, in the related-art liquid crystal display device, a conductive film (shield electrode CS) formed of a transparent conductive film is formed only in the display area AR and in the vicinity thereof, and the conductive film superposed on the lead lines SIG1$a$ and SIG2$a$ is not formed in the peripheral portion where the lead lines SIG1$a$ and SIG2$a$ are formed when viewed in a plane.

Subsequently, a description will be given of the delay times of the scanning signals at the end of the display area AR, that is, in the lead lines SIG1$a$ and SIG2$a$, and the gate lines GL in the area where the shield electrode CS is formed in the related-art liquid crystal display device. In the following description, it is assumed that a sheet resistance of aluminum of which the gate lines GL and the lead lines SIG1$a$, SIG2$a$ are made is 0.20, and the wiring widths a1, a2 and the wiring height are the same. Also, it is assumed that a specific permittivity of silicon nitride (SiN) of which the insulating films PAS1 and PAS2 are made is 5, and a permittivity of vacuum is $8.9 \times 10^{-12}$ F/m. In the following description, the parasitic capacitances formed between the adjacent gate lines GL and between adjacent lead lines SIG1$a$ and SIG2$a$ are very small as compared with the capacitances formed between the shield electrode CS and the gate lines GL, which are overlapped with each other through the insulating films PAS1 and PAS2. Therefore, the parasitic capacitances will be omitted.

The delay time T1 of the scanning signals that arrive at an input-end-part of the display area AR from the scanning signal driver circuit SDR through the lead lines SIG1$a$ each having the longer wiring length, and the gate lines GL overlapping with the shield electrode CS is represented as follows.

For example, if a wiring length L1$b$ of the gate lines GL overlapping with the shield electrode CS is L1$b$=7000 μm, and the wiring width a1 thereof is a1=5 μm, a wiring resistance R1$b$ of the gate lines GL is R1$b$=0.2×7000/5=280Ω. Also, the wiring capacitance C1$b$ becomes C1$b$=5×8.9×10$^{-12}$×5×10$^{-6}$×7000×10$^{-6}$/0.5=3.12 pF. Further, if a wiring length L1$a$ of the lead lines SIG1$a$ is L1$a$=70000 μm, and the wiring width a1 thereof is a1=5 μm, a wiring resistance R1$a$ of the lead lines SIG1$a$ is R1$a$=0.2×70000/5=2800Ω. Accordingly, the delay time T1 of the scanning signals that arrive at the input-end-part of the display area AR through the lead lines SIG1$a$ and the gate lines GL is T1=(R1$a$+R1$b$)×C1$b$=(280+2800)×3.12=9.61 ns.

On the other hand, the delay time T2 of the scanning signals that arrive at the input-end-part of the display area AR from the scanning signal driver circuit SDR through the lead lines SIG2$a$ each having the shorter wiring length, and the gate lines GL overlapping with the shield electrode CS is represented as follows. In this case, in the area of the gate lines GL overlapping with the shield electrode CS, the wiring length L2$b$ and the wiring width a2 are L2$b$=L1$b$ and a2=a1. Therefore, the wiring resistance R2$b$ of the gate lines GL is R2$b$=R1$b$=280Ω, and the wiring capacitance C2$b$ is C2$b$=C1$b$=3.12 pF. Also, if a wiring length L2$a$ of the lead lines SIG2$a$ is L2$a$=4000 μm, and the wiring width a2 thereof is a2=5 μm, a wiring resistance R2$a$ of the lead lines SIG2$a$ is R2$a$=0.2×4000/5=160Ω. Accordingly, the delay time T2 of the scanning signals that arrive at the input-end-part of the display area AR through the lead lines SIG2$a$ is T2=(R2$a$+R2$b$)×C2$b$=(280+160)×3.12=1.37 ns.

Accordingly, a ratio T1/T2 of the delay time T1 in the lead lines SIG1$a$ each having the longer wiring length to the delay time T2 in the lead lines SIG2$a$ each having the shorter wiring length is T1/T2=9.61/1.37=7.01. That is, in the related-art liquid crystal display device, a difference of about 7 times in the delay time T occurs between the scanning signals to be input to the gate lines GL closer to the scanning signal driver circuit SDR and the scanning signals to be input to the gate lines GL farther from the scanning signal driver circuit SDR.

On the contrary, in the liquid crystal display device according to the first embodiment, the conductive film EC overlapping with the lead lines SIG2 is formed only on the lead lines SIG2 each having the shorter wiring length, and the conductive film EC is not formed in the upper layer of the lead lines SIG1. Accordingly, the delay time T2 of the scanning signals that arrive at the input-end-part of the display area AR through the lead lines SIG1, and the gate lines GL superposed on the shield electrode CS according to the first embodiment is identical with that in the above-mentioned related-art liquid crystal display device. In this case, since a wiring length L1$d$ of the gate lines GL superposed on the shield electrode CS is L1$d$=L1$b$=7000 μm, and the wiring width a1 thereof is a1=5 μm, a wiring resistance R1$d$ of the gate lines GL is R1$d$=R1$b$=280Ω. Also, a wiring capacitance C1$d$ becomes C1$d$=C1$b$=3.12 pF. Also, since a wiring length L1$c$ of the lead lines SIG1 is L1$c$=L1$a$=70000 μm, and the wiring width a1 thereof is a1=5 μm, a wiring resistance R1$c$ is R1$c$=R1$a$=2800Ω. Accordingly, the delay time T1 of the scanning signals that arrive at the input-end-part of the display area AR through the lead lines SIG1 is T1=(R1$c$+R1$d$)×C1$d$=9.61 ns.

On the other hand, even in the area where the lead lines SIG2 are formed, since the conductive film EC superposed on the lead lines SIG2 is formed, the amount of delay as large as the capacitance corresponding to the capacitive elements formed by the lead lines SIG2 and the conductive film EC is added. Accordingly, the delay time T2 in the lead lines SIG2 and the gate lines GL which arrive at the side edge portion of the display area AR from the end connected to the scanning signal driver circuit SDR is represented as follows.

First, also in the lead lines SIG2 according to the first embodiment, as in the related-art liquid crystal display, the wiring length L2$d$ and the wiring width a2 are L2$d$=L2$b$=L1$b$ and a2=a1 in the area of the gate lines GL overlapping with the shield electrode CS, and therefore the wiring resistance R2$d$ of the gate lines GL superposed on the shield electrode CS is R2$d$=R2$b$=R1$b$=280Ω. Also, since the wiring length L2$c$ and the wiring width a2 of the lead lines SIG2 in the first embodiment 1 are identical with those in the related art, the wiring resistance R2$c$ of the lead lines SIG2 is R2$c$=R2$a$=160Ω.

In this situation, the conductive film EC superposed on the lead lines SIG2 is formed in the same layer as that of the shield electrode CS. Accordingly, the wiring capacitance C2$d$, which is a total of the wiring capacitances formed between the lead lines SIG2 and the conductive film EC, and the wiring capacitances formed between the gate lines GL and the shield electrode CS, is C2$d$=5×8.9×10$^{-12}$×5×10$^{-6}$×(7000+4000)×10$^{-6}$/0.5=4.90 pF. Accordingly, the delay time T2 of the scanning signals that arrive at the input-end-part of the display area AR through the lead lines SIG2 is T2=(R2$c$+R2$d$)×C2$d$=(280+160)×4.90=2.16 ns.

From the above results, the ratio T1/T2 of the delay time T1 in the lead lines SIG1 each having the longer wiring length to the delay time T2 in the lead lines SIG2 each having the shorter wiring length is T1/T2=9.61/2.16=4.45. Accordingly, in the liquid crystal display device according to the first embodiment, the ratio of the delay time T can be suppressed from 7 times in the related art to about 4 times in the scanning signals to be input to the gate lines GL closer to the scanning signal driver circuit SDR, and the scanning signals to be input to the gate lines GL farther from the scanning signal driver circuit SDR. As a result, the uneven brightness caused by the signal delay associated with the difference in the wiring length of the lead lines SIG can be remarkably suppressed, and the display quality of the liquid crystal display device can be improved.

[Second Embodiment]

Figure 7:
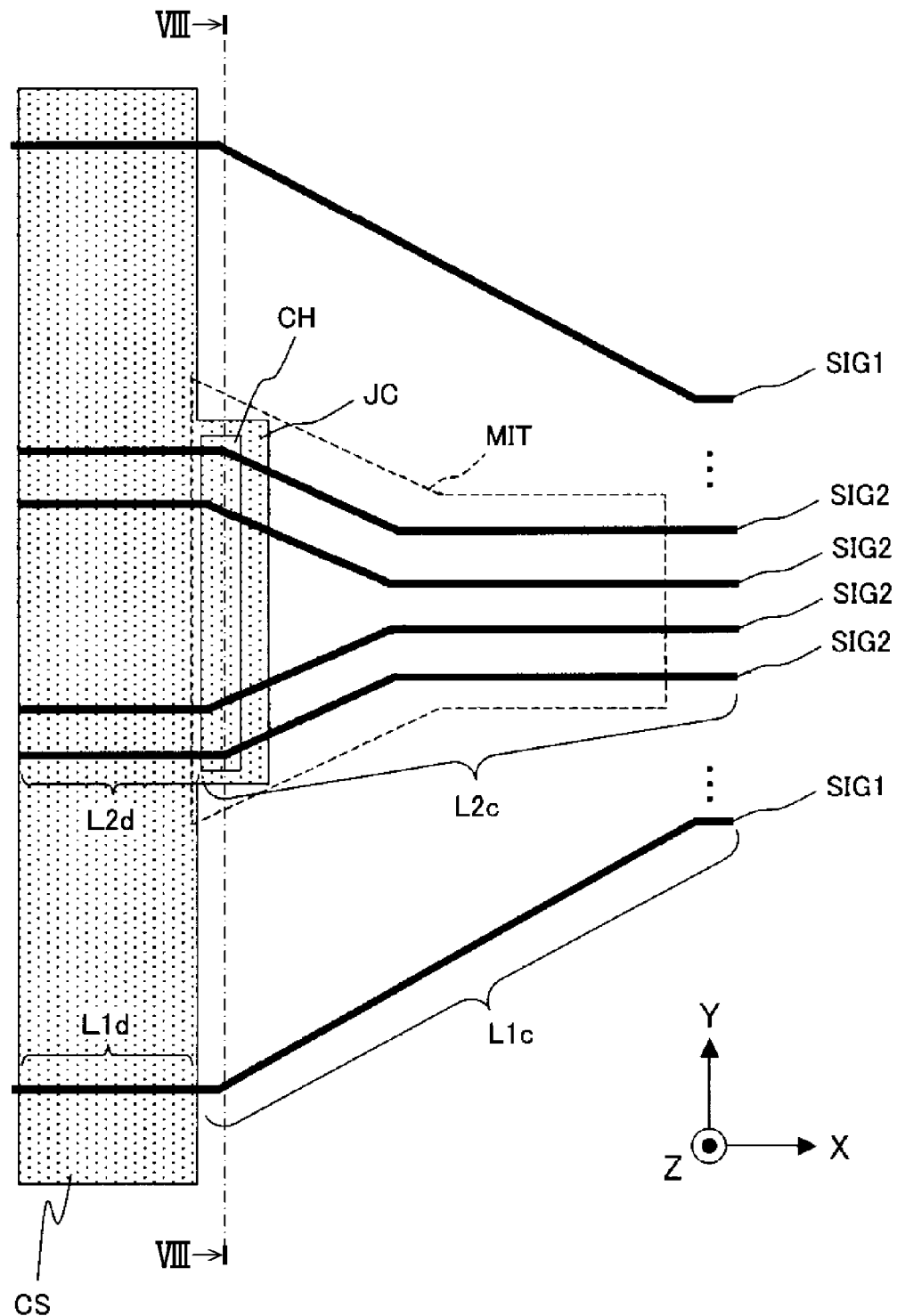
FIG. 7 is an enlarged view of a peripheral portion in one liquid crystal display device which is a display device according to a second embodiment of the present invention.
Figure 8:
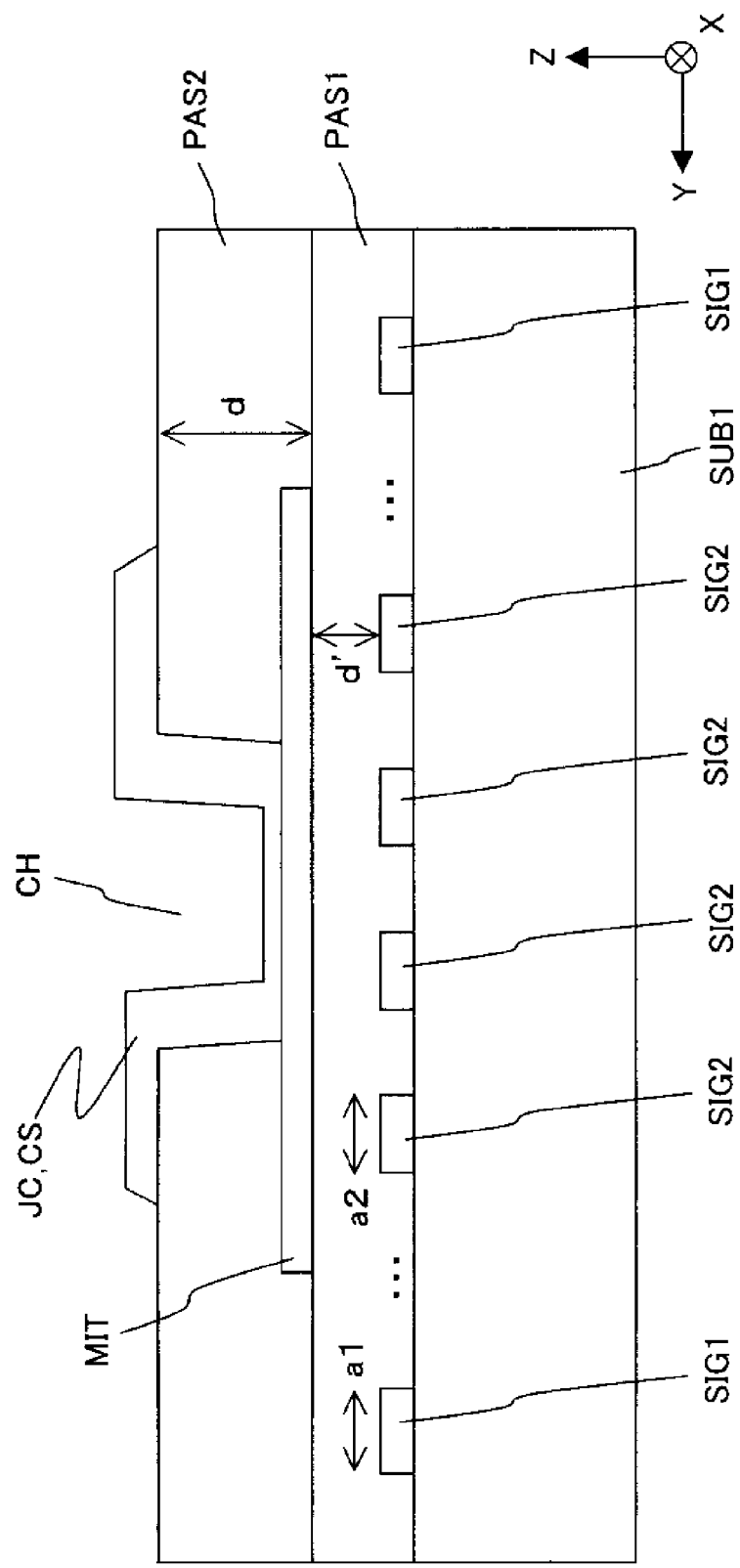
FIG. 8 is a cross-sectional view taken along a line VIII-VIII illustrated in FIG. 7.

FIG. 7 is an enlarged view of a peripheral portion in a liquid crystal display device which is a display device according to a second embodiment of the present invention, and FIG. 8 is a cross-sectional view taken along a line VIII-VIII illustrated in FIG. 7. In the liquid crystal display device according to the second embodiment, the other configurations except for the configuration of a conductive film MIT are identical with those in the first embodiment, and therefore, in the following description, the conductive film MIT will be described in detail.

As illustrated in FIG. 7, in the liquid crystal display device according to the second embodiment, the conductive film MIT different from the shield electrode CS is formed, the lead lines SIG2 each having the shorter wiring length of the lead lines SIG1 and SIG2 formed in the peripheral portion, and the conductive film MIT overlap with each other when viewed in a plane. In this case, the shield electrode CS has an extension portion JC, and the extension portion JC is protruded from the shield electrode CS toward the peripheral portion, and superposed on the end of the conductive film MIT. A contact hole CH is formed in the superposed area, and the shield electrode CS and the conductive film MIT are electrically connected to each other through the extension portion JC.

As illustrated in FIG. 8, in the liquid crystal display device according to the second embodiment, the conductive film MIT is formed in an upper layer of the insulating film PAS1 formed to cover the lead lines SIG1 and SIG2 which are formed on the liquid crystal surface side of the first substrate SUB1. The conductive film MIT is formed in the same process as that of the pixel electrodes, that is, formed in the same layer as that of the pixel electrodes, and is made of a transparent conductive film material. The insulating film PAS2 is formed in the upper layer of the conductive film MIT so as to cover the conductive film MIT, and the shield electrode CS formed in the same layer as that of the common electrode is formed in an upper layer of the insulating film PAS2. Accordingly, the shield electrode CS and the conductive film MIT are electrically connected to each other through the contact hole CH formed in the insulating film PAS2. The conductive film MIT may be formed, for example, in the same process as that of the drain lines formed of metal thin films formed on an upper surface of the insulating film PAS1.

Thus, since the lead lines SIG2 according to the second embodiment overlap with the conductive film MIT formed on the upper surface of the insulating film PAS1, an interval between the lead lines SIG2 and the conductive film MIT is a film thickness d' of the insulating film PAS1. That is, as compared with the first embodiment, the interval between the lead lines SIG2 and the conductive film MIT can be reduced by a film thickness d of the insulating film PAS2. As a result, since the capacitance of the capacitive elements formed by the lead lines SIG2 and the conductive film MIT can be increased, the delay time T2 of the scanning signals in the lead lines SIG2 each having the shorter wiring length can be further increased. That is, even if the conductive film MIT overlaps with the lead lines SIG2 each having the same wiring length, the delay time can be increased more than the delay time in the lead lines SIG2 of the first embodiment. As a result, the delay time difference T=T1−T2 between the delay time T1 of the lead lines SIG1 each having the longer wiring length and the delay time T2 of the lead lines SIG2 can be further decreased, and the display quality can be further improved.

The delay times T1 and T2 in the lead lines SIG1 and SIG2 according to the second embodiment are represented as follows. Since the lead lines SIG1 according to the second embodiment are identical in the configuration with those in the first embodiment, the delay time T1 of the scanning signals that arrive at the input-end-part of the display area AR through the lead lines SIG1 and the gate lines GL is T1= $(R1c+R1d) \times C1d = (280+2800) \times 3.12 = 9.61$ ns.

On the other hand, in the lead lines SIG2 and the gate lines GL connected to the lead lines SIG2, the gate lines GL overlap with the shield electrode CS, and the lead lines SIG2 overlap with the conductive film MIT. Accordingly, the wiring capacitance C2d formed between the gate lines GL and the shield electrode CS is $C2d=5 \times 8.9 \times 10^{-12} \times 5 \times 10^{-6} \times 7000 \times 10^{-6}/0.5 = 3.12$ pF. Likewise, a wiring capacitance C2e formed between the lead lines SIG2 and the conductive film MIT is $C2e=5 \times 8.9 \times 10^{-12} \times 5 \times 10^{-6} \times 4000 \times 10^{-6}/0.2 = 4.43$ pF. Hence, a synthetic capacitance C of the signal lines that arrive at the input-end-part of the display area AR through the lead lines SIG2 and the gate lines GL is $C=C2d+C2e=3.12+4.43=7.55$ pF. As a result, the delay time T2 of the scanning signals that arrive at the input-end-part of the display area AR through the lead lines SIG2 and the gate lines GL is T2=$(280+160) \times 7.55 = 3.32$ ns.

From the above results, the ratio T1/T2 of the delay time T1 in the lead lines SIG1 each having the longer wiring length to the delay time T2 in the lead lines SIG2 each having the shorter wiring length is T1/T2=9.61/3.32=2.89. Accordingly, in the liquid crystal display device according to the second embodiment, the ratio of the delay time T can be suppressed from 7 times in the related art to about 2.89 times in the scanning signals to be input to the gate lines GL closer to the scanning signal driver circuit SDR, and the scanning signals to be input to the gate lines GL farther from the scanning signal driver circuit SDR. That is, the uneven brightness caused by the signal delay associated with the difference in the wiring length of the lead lines SIG can be suppressed more than the configuration of the first embodiment, and the display quality of the liquid crystal display device can be further improved.

In the configuration according to the second embodiment, the extension portion JC extending from the shield electrode CS is formed, and the shield electrode CS and the conductive film MIT are electrically connected to each other by the contact hole CH formed in the superposition of the extension portion JC and the conductive film MIT. However, the present invention is not limited to this configuration. For example, signal lines that are connected to the conductive film MIT, and supply a given voltage may be provided on the side edge portion of the first substrate SUB1, or an extension portion that extends from the conductive film MIT in the shield electrode CS direction may be provided, and the contact hole may be formed in the superposition area of the extension portion and the shield electrode CS to electrically connect the shield electrode CS and the conductive film MIT.

Figure 9:
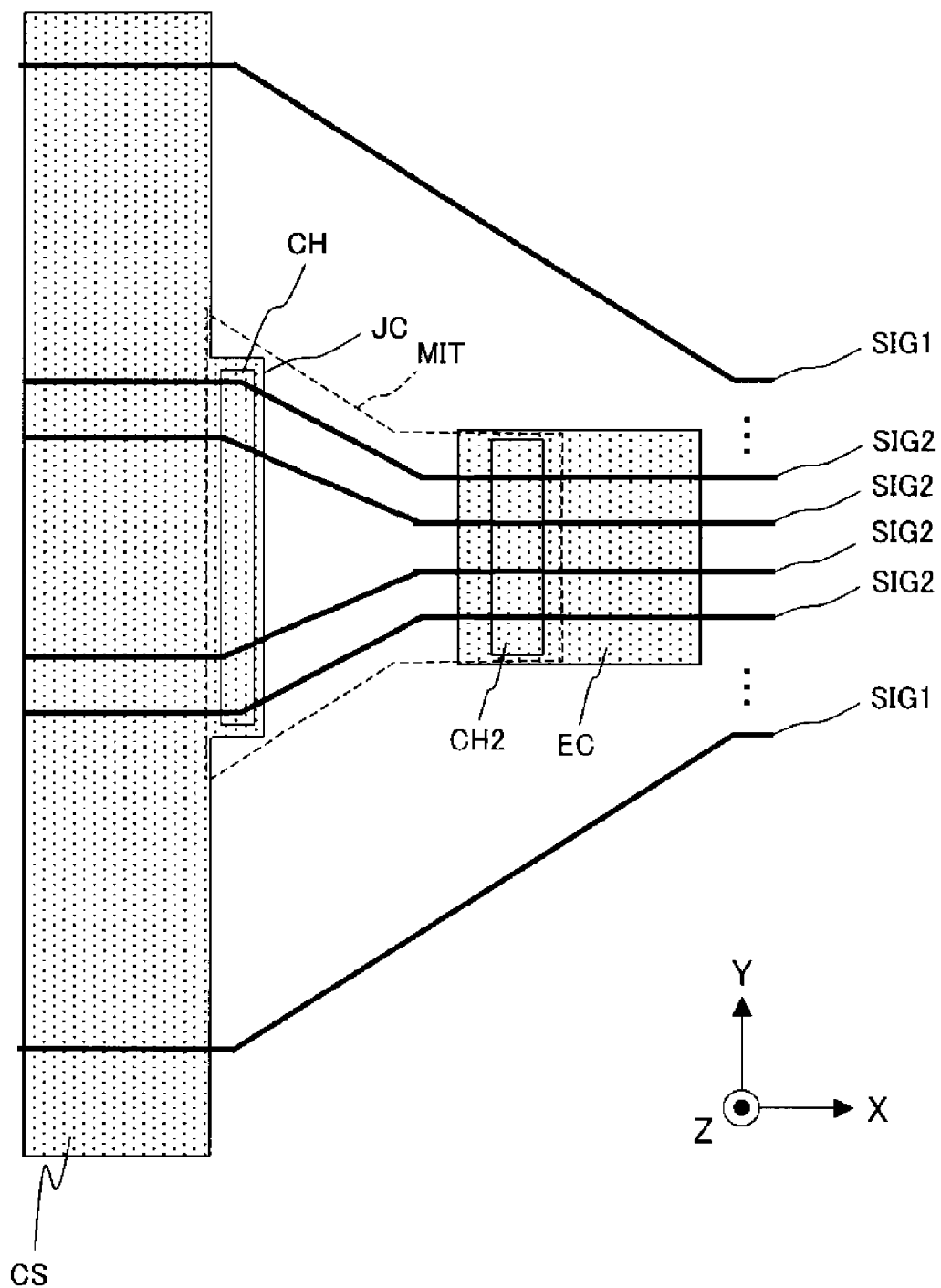
FIG. 9 is an enlarged view of a peripheral portion in another liquid crystal display device which is the display device according to the second embodiment of the present invention.

Also, as another liquid crystal display device according to the second embodiment, for example, as illustrated in FIG. 9, the conductive film MIT and the conductive film EC may be used as the conductive film superposed on the lead lines SIG2. As in the above-mentioned first embodiment, the conductive film EC is formed in the same layer as that of the shield electrode CS. Therefore, the shield electrode CS and the conductive film EC are electrically connected to each other through a contact hole CH2 formed in an area where an end of the conductive film MIT in the X-direction overlaps with an end of the conductive film EC.

That is, in the liquid crystal display device illustrated in FIG. 9, an interval between the conductive film MIT and the lead lines SIG2 is formed to be smaller in the area where the conductive film MIT and the lead lines SIG2 overlap with each other when viewed in a plane. The interval between the conductive film EC and the lead lines SIG2 is formed to be relatively larger in the area where the conductive film EC and the lead lines SIG2 overlap with each other. Accordingly, in the configuration illustrated in FIG. 9, in addition to the above-mentioned advantages, there can be obtained such special advantages that the sizes of the area in which the conductive film MIT and the lead lines SIG2 overlap with each other, and the area in which the conductive film EC and the lead lines SIG2 overlap with each other are arbitrarily set so that the capacitances formed between the lead lines SIG2 and the conductive films MIT, EC can be arbitrarily set, and the delay time of the scanning signals in the lead lines SIG2 can be optimized.

[Third Embodiment]

Figure 10:
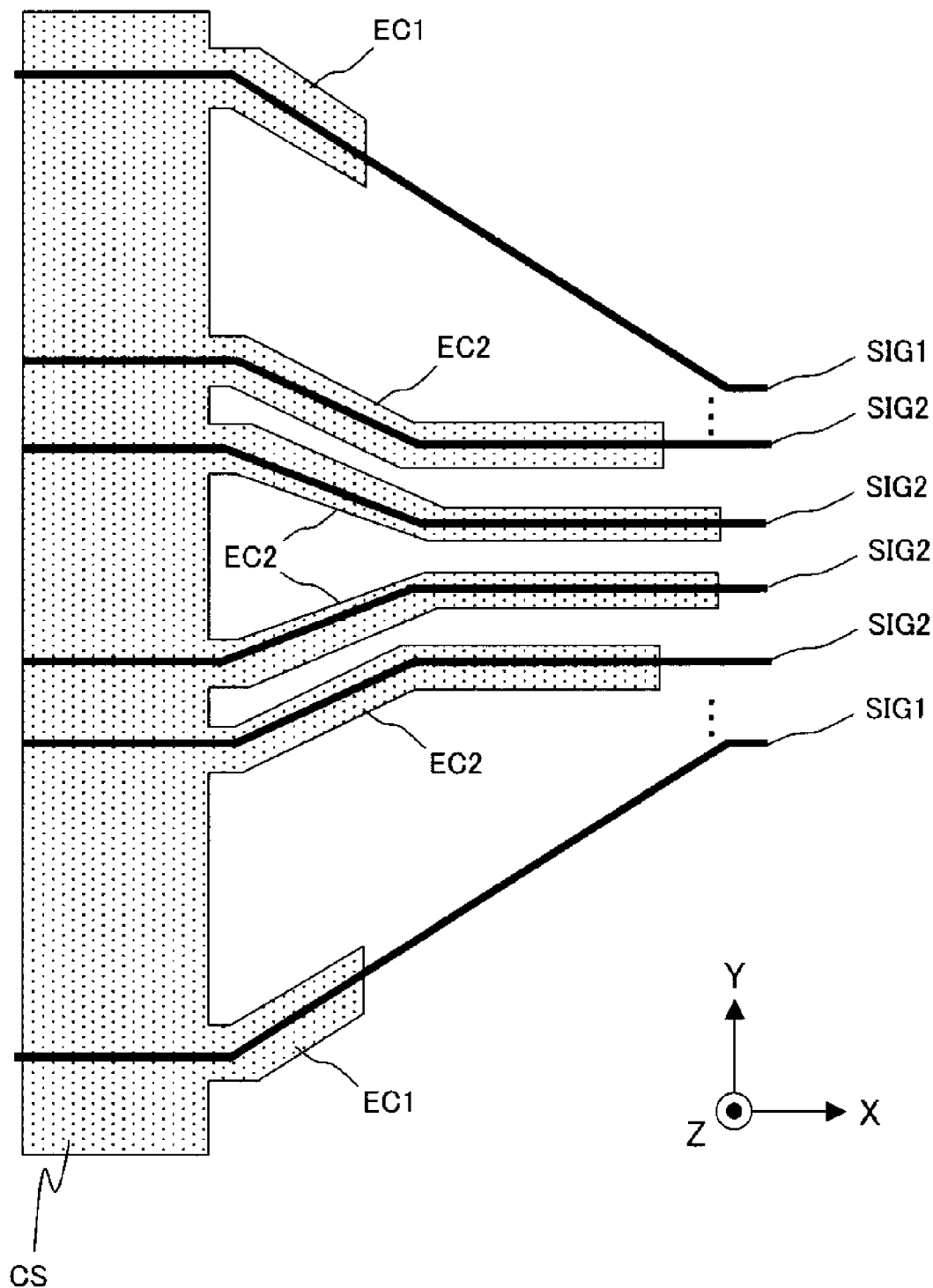
FIG. 10 is a diagram illustrating an outline configuration of lead lines in a liquid crystal display device which is a display device according to a third embodiment of the present invention.

FIG. 10 is a diagram illustrating an outline configuration of lead lines in a liquid crystal display device which is a display device according to a third embodiment of the present invention. The other configurations except for the configuration of conductive films EC1 and EC2 superposed on the lead lines SIG1 and SIG2 are identical with those in the first embodiment.

As is apparent from FIG. 10, the conductive films EC1 and EC2 overlap with all of the lead lines SIG1 and SIG2. Further, in the conductive films EC1 and EC2 according to the third embodiment, the conductive film EC1 or EC2 is formed for each of the lead lines SIG1 and SIG2 along the extension direction thereof. The conductive films EC1 and EC2 that extend from the shield electrode CS are arrayed in parallel to the Y-direction. With the above configuration, in the conductive films EC1 and EC2 according to the third embodiment, the amount of superposition can correspond to the respective lead lines SIG, and the usage of the transparent conductive film material of which the conductive films EC1 and EC2 are made is reduced. Alternatively, the transparent conductive film may be formed in areas between the adjacent conductive films EC1 and EC2, or as in the second embodiment, the transparent conductive film may be formed in the areas between the conductive films EC2 adjacent to each other.

Also, in the third embodiment, the X-direction lengths (extension direction length, electrode length) of the conductive films EC1 and EC2 extending from the shield electrode CS along the respective lead lines SIG1 and SIG2, are inversely proportional to the wiring lengths of the lead lines SIG1 and SIG2. That is, the conductive films EC1 superposed on the lead lines SIG1 each having the longer wiring length are formed to be shorter in the electrode length than the conductive films EC2 superposed on the lead lines SIG2 each having the shorter wiring length. With the above electrode lengths, the capacitance of the capacitive elements formed by the lead lines SIG2 and the conductive film EC2 is configured to be larger than the capacitance of the capacitive elements formed by the lead lines SIG1 and the conductive film EC1. As a result, also in the liquid crystal display device according to the third embodiment, since the difference in the delay time between the lead lines SIG1 and SIG2 can be reduced, the same advantages as those in the first embodiment can be obtained.

Also, in the configuration according to the third embodiment, the superposed conductive films EC2 are formed with the different electrode lengths for the lead lines SIG2 each having the shorter wiring length than the lead lines SIG1 connected to the gate lines which are formed in the side edge area of the display area AR. That is, in the conductive films EC2 according to the third embodiment, the capacitances of the capacitive elements formed by the respective lead lines SIG2 and the conductive films EC2 are changed for the lead lines SIG2 each having the shorter wiring length. In particular, the conductive films EC2 each having the electrode length that is inversely proportional (corresponds) to the wiring length of the lead lines SIG2 overlap with the lead lines SIG2. With the above configuration, the delay time difference between the adjacent lead lines SIG2, that is, the delay time difference between the pixels adjacent in the Y-direction is reduced. As a result, the liquid crystal display device according to the third embodiment can obtain such special advantages that the occurrence of the uneven display between the adjacent pixels or the like can be suppressed, and the display quality can be further improved.

In the conductive films EC1 and EC2 according to the third embodiment, only the conductive films EC2 superposed on the lead lines SIG2 are formed with the different electrode length according to the wiring length of the lead lines SIG2. However, the present invention is not limited to this configuration. For example, the conductive films EC1 and EC2 with the electrode lengths that are correspond (inversely proportional) to the wiring lengths of all the lead lines SIG1 and SIG2 overlap with those lead lines SIG1 and SIG2. With this configuration, the delay time difference between the adjacent lead lines SIG, that is, the delay time difference between the pixels adjacent in the Y-direction can be reduced. As a result, there can be obtained such special advantages that the occurrence of the uneven display between the adjacent pixels or the like can be suppressed, and the display quality can be further improved.

[Fourth Embodiment]

Figure 11:
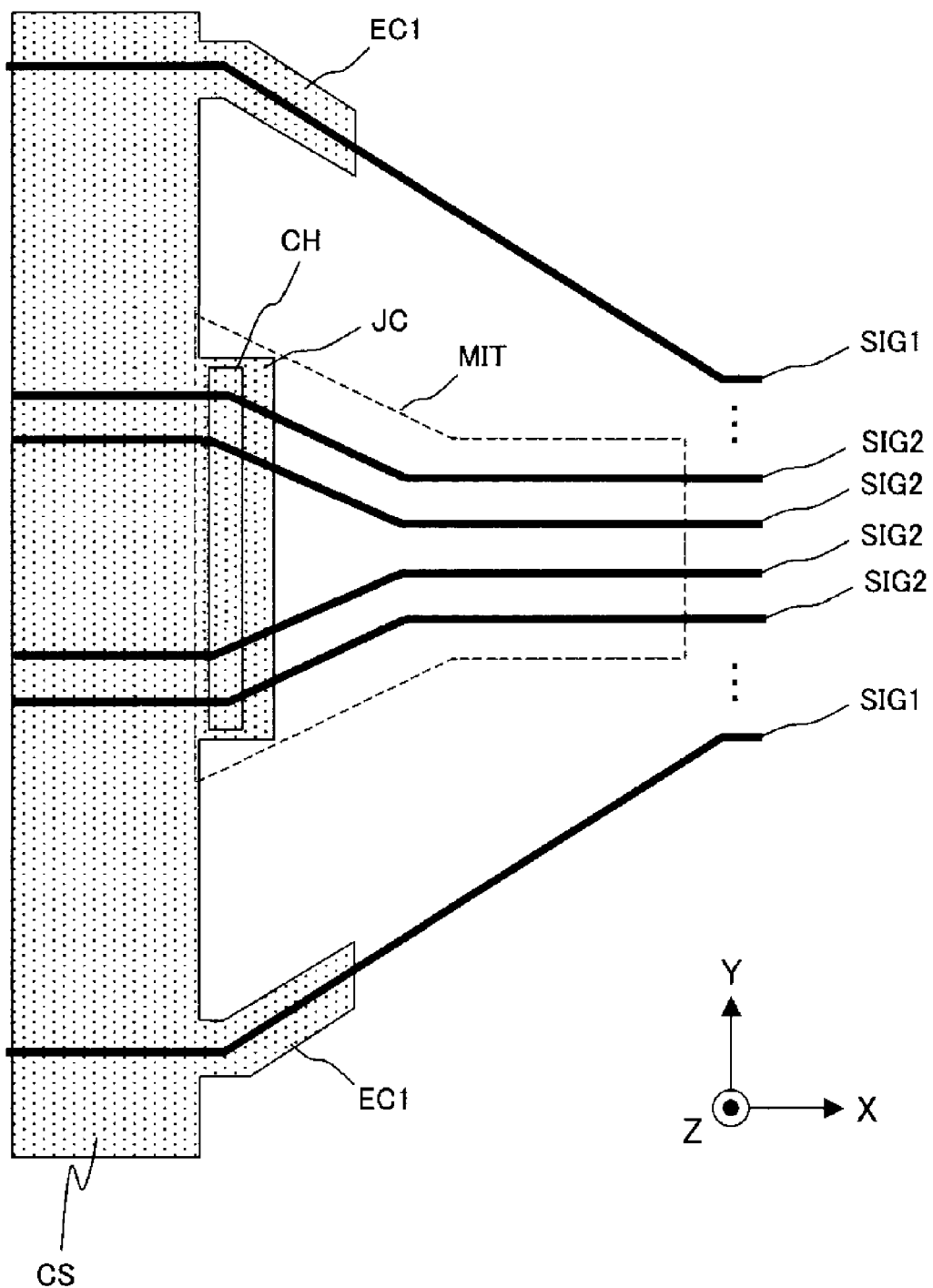
FIG. 11 is a diagram illustrating an outline configuration of lead lines in a liquid crystal display device which is a display device according to a fourth embodiment of the present invention.

FIG. 11 is a diagram illustrating an outline configuration of lead lines in a liquid crystal display device which is a display device according to a fourth embodiment of the present invention. The other configurations except for the configuration of the conductive films EC1 superposed on the lead lines SIG1 are identical with those in the second embodiment.

As is apparent from FIG. 11, in the fourth embodiment, the conductive films EC1 overlap with the lead lines SIG1 each having the longer wiring length, and the conductive film MIT overlaps with the lead lines SIG2 each having the shorter wiring length. That is, also in the liquid crystal display device according to the fourth embodiment, the respective lead lines SIG1 and SIG2 overlap with any one of the conductive films EC1 and the conductive film MIT.

In particular, as in the second embodiment, the lead lines SIG2 overlap with the conductive film MIT arranged on the surface of the insulating film PAS1 not shown which is formed to cover the surfaces of the lead lines SIG1 and SIG2. As a result, the same advantages as those in the second embodiment can be obtained.

Also, in the fourth embodiment, the conductive films EC1 extend from the shield electrodes CS along the respective lead lines SIG1, and in this case, the electrode length of the conductive films EC1 is formed to be shorter than the electrode length in the X-direction of the conductive film MIT formed along the area in which the lead lines SIG2 are formed. The electrode lengths are inversely proportional to the respective wiring lengths of the lead lines SIG1 and SIG2. That is, the conductive films EC1 superposed on the lead lines SIG1 each having the longer wiring length are formed to be shorter in the electrode length than the conductive film MIT superposed on the lead lines SIG2 each having the shorter wiring length. With the above electrode length, the capacitance of the capacitive elements formed by the lead lines SIG2 and the conductive film MIT is configured to be larger than the capacitance of the capacitive elements formed by the lead lines SIG1 and the conductive films EC1. As a result, also in the liquid crystal display device according to the third embodiment, a difference in the delay time between the lead lines SIG1 and SIG2 can be reduced.

[Fifth Embodiment]

Figure 12:
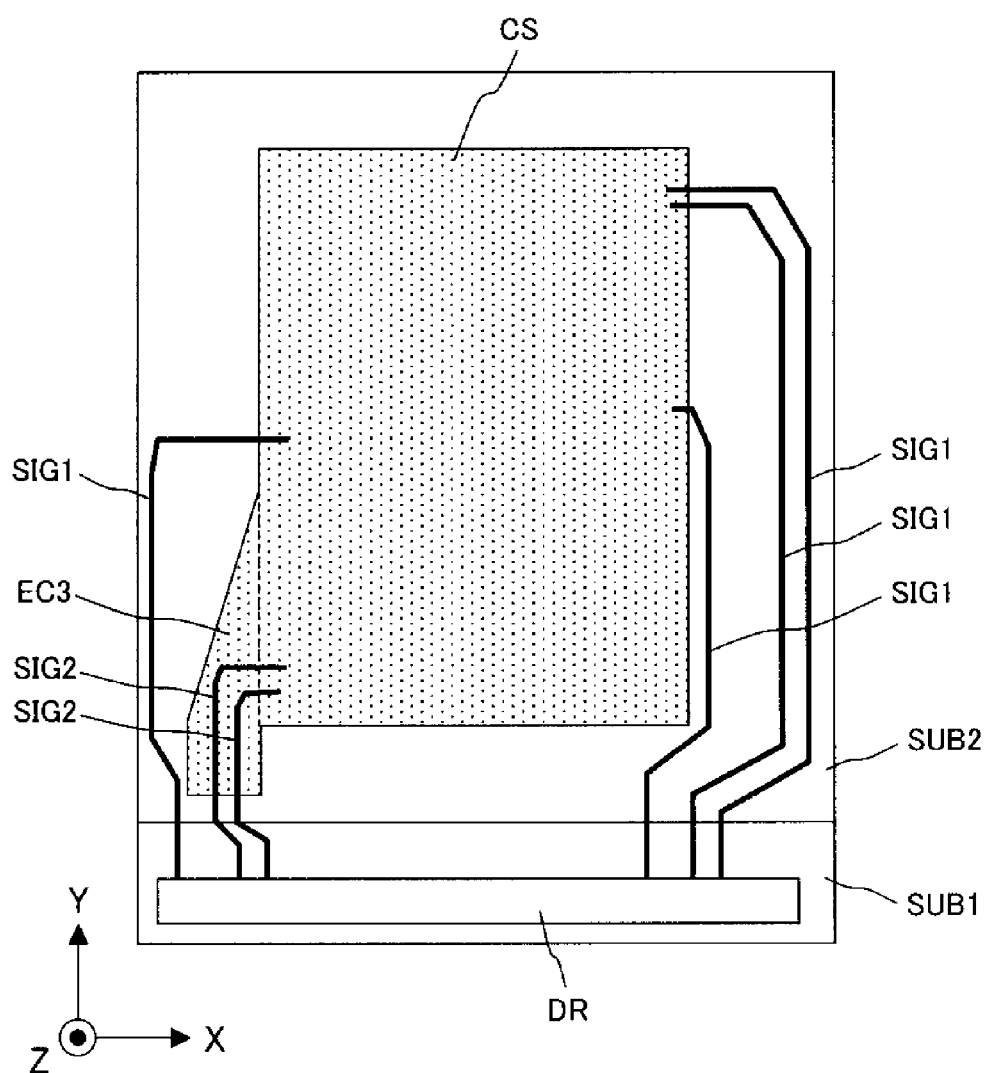
FIG. 12 is a plan view illustrating a liquid crystal display device which is a display device according to a fifth embodiment of the present invention.

FIG. 12 is a plan view illustrating a liquid crystal display device which is a display device according to a fifth embodiment of the present invention. A driver circuit that generates and outputs the scanning signals and the video signals is mounted on one side portion of the first substrate SUB1. The liquid crystal display device according to the fifth embodiment is identical in the configuration with the first embodiment except for a driver circuit DR, positions at which the lead lines SIG1 and SIG2 that connect the driver circuit DR and the gate lines are formed, and a conductive film EC3.

As is apparent from FIG. 12, in the configuration of the liquid crystal display device according to the fifth embodiment, the driver circuit DR mounted on a lower side portion of the first substrate SUB1 in the figure, and the gate lines not shown which are arrayed in parallel within the display area are connected by the lead lines SIG1 and SIG2 formed in the peripheral portion of the first substrate SUB1 on the left and right sides of the figure. In this case, in the liquid crystal display device according to the fifth embodiment, the gate lines in the area closer to the driver circuit DR and the driver circuit DR are connected by the lead lines SIG1 and SIG2 formed in the peripheral portion on the left side of FIG. 12.

Also, the gate lines in the area farther from the driver circuit DR and the driver circuit DR are connected by the lead lines SIG1 formed in the peripheral portion on the right side of FIG. 12.

In this case, in the liquid crystal display device according to the fifth embodiment, the conductive film EC3 overlaps with the lead lines SIG2 connected to the gate lines formed in the area closer to the side portion on which the driver circuit DR is mounted, among the lead lines SIG1 and SIG2 arrayed in the peripheral portion on the left side of FIG. 12. The conductive film EC3 is formed of the transparent conductive film extending from the shield electrode CS as in the above-mentioned first embodiment. Therefore, the conductive film EC3 is held to the same potential as that of the shield electrode CS, and the same advantages as those in the first embodiment can be obtained.

In the configuration of the fifth embodiment, the lead lines formed in the peripheral portion on the left side of FIG. 12 are separated into the lead line SIG1 having the longer wiring length, and the lead lines SIG2 each having the shorter wiring length than that lead line SIG1, and the conductive film EC3 is formed in an upper layer of the lead lines SIG2. However, the present invention is not limited to this configuration. For example, the conductive film EC3 may be superposed on the lead lines connected to the gate lines arrayed in parallel in an area closer to the driver circuit DR than a center portion of the display area, that is, all of the lead lines formed in the peripheral portion on the left side of FIG. 12.

[Sixth Embodiment]

Figure 13:
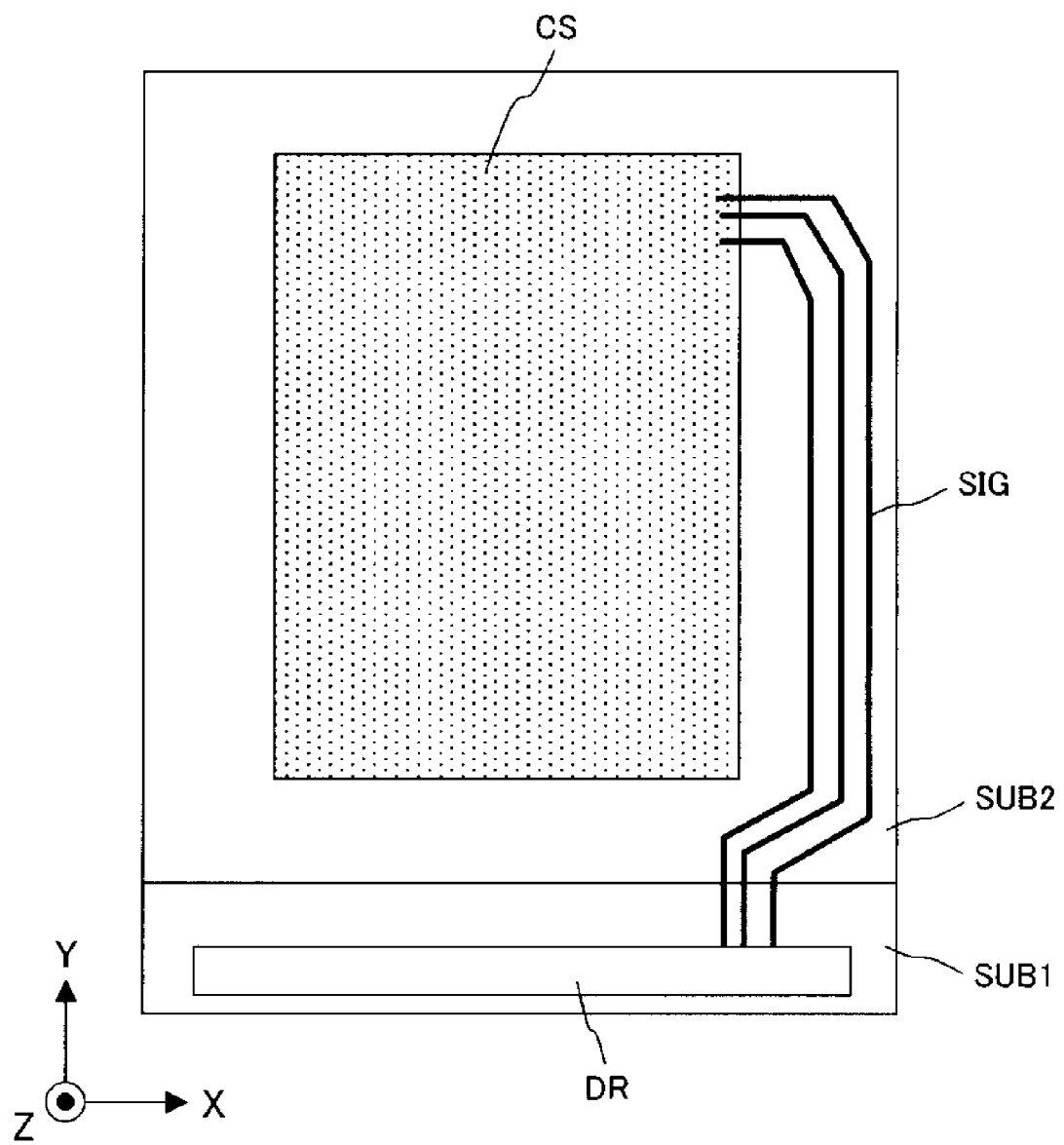
FIG. 13 is a plan view illustrating an outline configuration of a liquid crystal display device which is a display device according to a sixth embodiment of the present invention.
Figure 14:
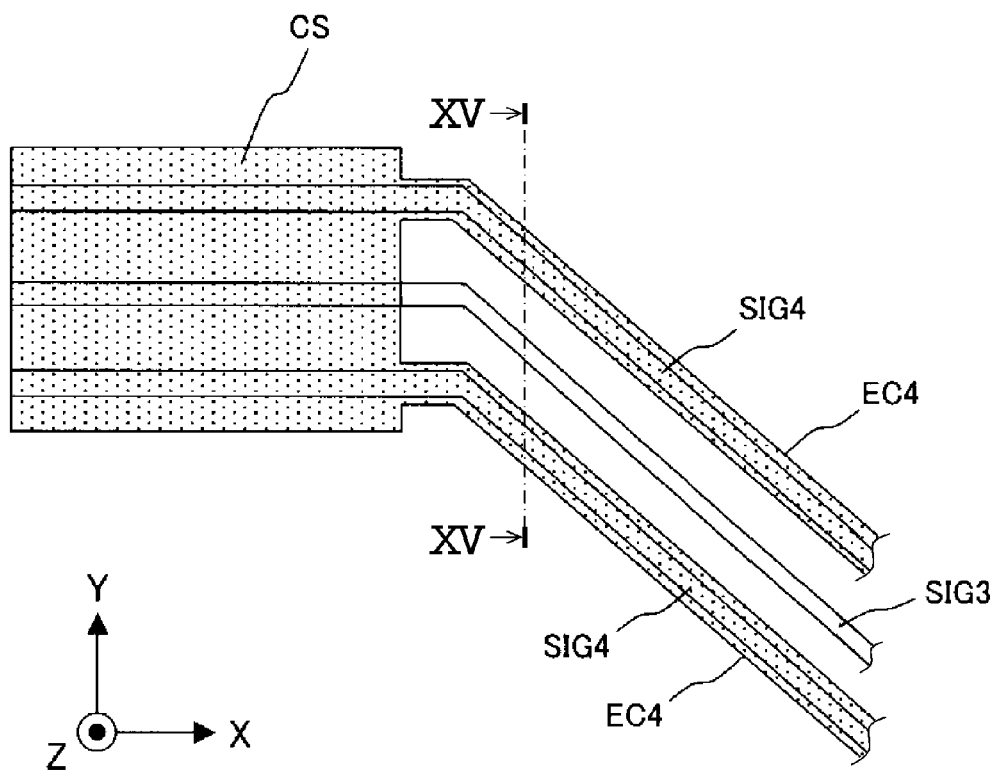
FIG. 14 is an enlarged view of a peripheral portion in the liquid crystal display device according to the sixth embodiment of the present invention.
Figure 15:
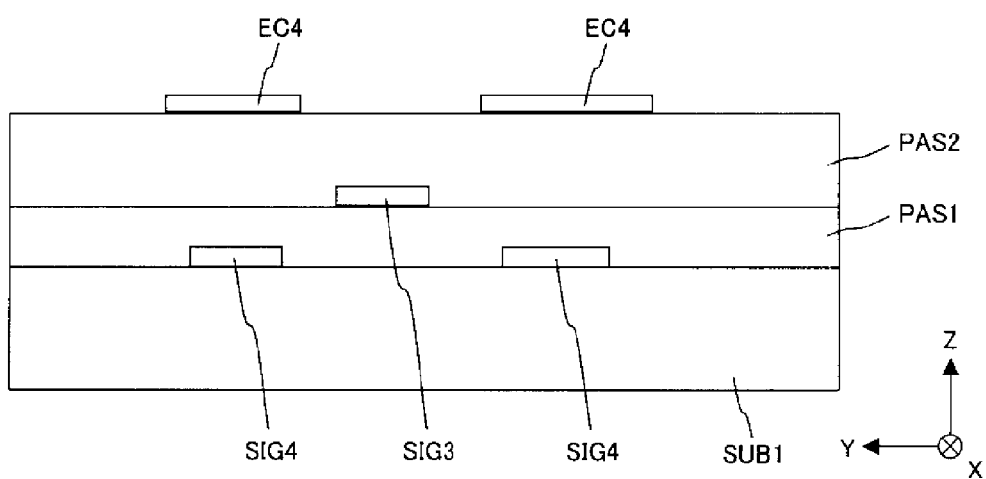
FIG. 15 is a cross-sectional view taken along a line XV-XV illustrated in FIG. 14.

FIG. 13 is a plan view illustrating an outline configuration of a liquid crystal display device which is a display device according to a sixth embodiment of the present invention, FIG. 14 is an enlarged view of a peripheral portion in the liquid crystal display device according to the sixth embodiment of the present invention, and FIG. 15 is a cross-sectional view taken along a line XV-XV illustrated in FIG. 14. The liquid crystal display device according to the sixth embodiment is identical in the configuration with the fifth embodiment except for the configuration of the lead lines SIG that connect the driver circuit DR and the gate lines, and a conductive film EC4. Also, in the liquid crystal display device according to the sixth embodiment, the lead lines SIG are also arrayed in the peripheral portion on the left side of FIG. 13, but will be omitted from the following description. The configuration of the fifth or sixth embodiment can be also applied to the liquid crystal display device in which the lead lines SIG are arrayed in only the peripheral portion on one side, in the peripheral portion on the left side or the right side of FIG. 13.

As is apparent from FIG. 13, also in the liquid crystal display device according to the sixth embodiment, the driver circuit DR that outputs the scanning signals and the video signals is mounted on the lower side portion of the first substrate SUB1 in the figure, the lead lines SIG are formed in the peripheral portion on the left and right sides of the first substrate SUB1 in the figure, and the driver circuit DR and the gate lines not shown within the display area are electrically connected to each other.

The lead lines SIG according to the sixth embodiment include a lead line SIG3 formed of a conductive film made of, for example, chrome (Cr) or ITO, and lead lines SIG4 each formed of a metal thin film made of aluminum or the like. As illustrated in FIG. 15, the lead lines SIG3 and SIG4 thus configured are formed in different thin film layers. For example, the lead lines SIG4 formed in the same layer as that of the gate lines each formed of a metal thin film are formed on the surface of the first substrate SUB1. On the contrary, the lead line SIG3 formed in the same layer as that of the drain lines made of chrome or the pixel electrodes each formed of a transparent conductive film and the like, is formed on the upper surface of the insulating film PAS1 formed on the upper surface of the lead lines SIG4. In this case, the lead lines SIG4 each formed of a metal thin film small in the sheet resistance are small in the wiring resistance and small in the delay of the scanning signal. However, the lead line SIG3 made of chrome or the transparent conductive film which is large in the sheet resistance is large in the wiring resistance. Therefore, the delay of the scanning signals becomes larger than that in the lead lines SIG4.

Also, as is apparent from FIG. 15, the conductive films EC4 extending from the shield electrode CS are formed on the upper layer of the lead lines SIG4 so as to be superposed on the lead lines SIG4 when viewed in a plane. That is, as illustrated in FIG. 14, the conductive films EC4 are formed on the upper surface of the insulating film PAS2 formed to cover the upper surface of the lead line SIG3 at positions superposed on the lead lines SIG4. As a result, in the lead lines SIG4 according to the sixth embodiment, the capacitive elements are formed by the lead lines SIG4 and the conductive films EC 4, and the wiring capacitance can be increased.

Figure 16:
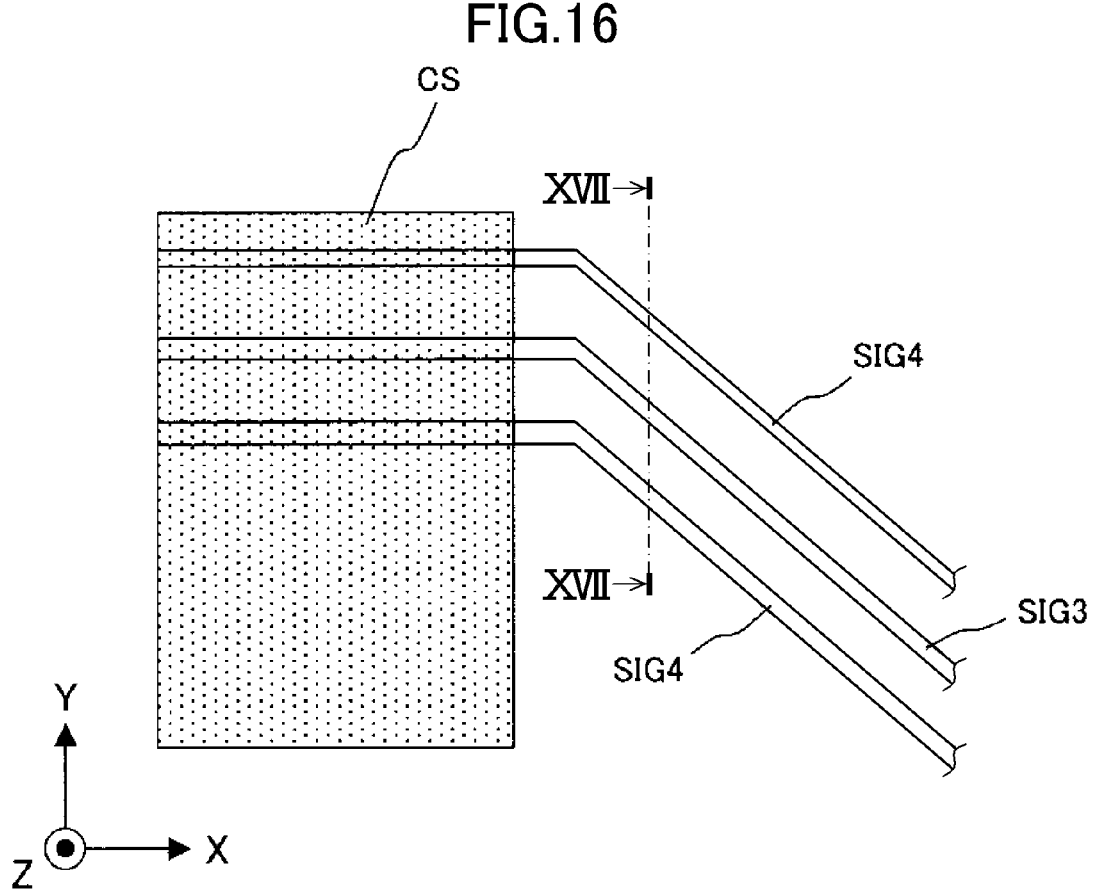
FIG. 16 is a diagram illustrating the lead lines in the peripheral portion in the related-art liquid crystal display device.
Figure 17:
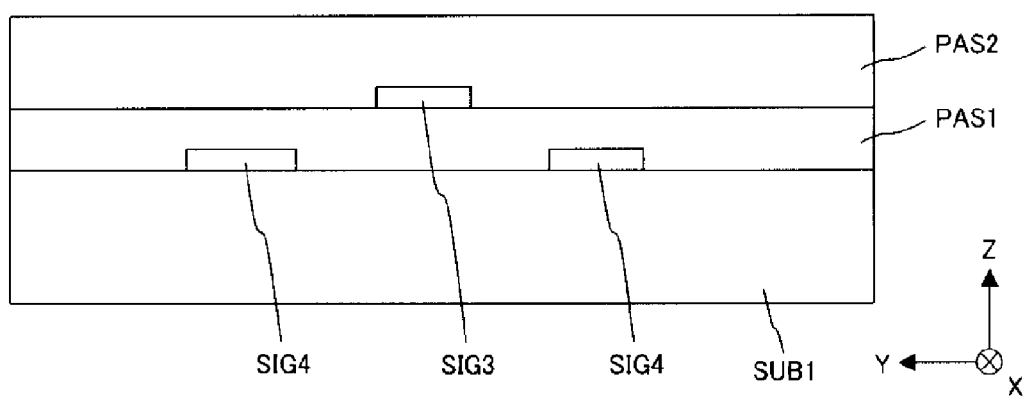
FIG. 17 is a cross-sectional view taken along a line XVII-XVII illustrated in FIG. 16.

As compared with the liquid crystal display device according to the sixth embodiment, in the related-art liquid crystal display device, the shield electrode CS is not configured to cover the lead lines SIG3 and SIG4, as illustrated in FIG. 16. That is, as illustrated in FIG. 17 which is a cross-sectional view taken along a line XVII-XVII' in FIG. 16, only the insulating film PAS2 is formed in the upper layer of the lead line SIG3, and only the insulating films PAS1 and PAS2 are formed in the upper layer of the lead lines SIG4. Accordingly, the delay time of the scanning signals in the lead lines SIG3 is larger than in the lead lines SIG4, so the lead line SIG3 has large wiring resistance.

On the contrary, in the liquid crystal display device according to the sixth embodiment, since the capacitance can be increased as large as the capacitance of the capacitive elements formed by the lead lines SIG4 and the conductive films EC4, the delay time until the scanning signal output from the driver circuit DR arrives at the side edge portion of the display area can be increased. Accordingly, a difference in the delay time between the scanning signals that arrive at the gate lines through the lead lines SIG3 larger in the wiring resistance, and the scanning signals that arrive at the gate lines through the lead lines SIG4 smaller in the wiring resistance, that is, the delay time difference between the lead line SIG3 and the lead lines SIG4 can be reduced. As a result, the same advantages as those in the first embodiment can be obtained.

In the liquid crystal display device according to the sixth embodiment, the lead lines SIG4 each formed of the metal thin film or the like small in the wiring resistance, and the lead line SIG3 made of chrome, the transparent conductive film or the like which is large in the wiring resistance are alternately arrayed one by one. However, the present invention is not limited to the configuration in which the lead lines SIG3 and SIG4 are alternately arrayed. For example, the present invention can be also applied to a configuration in which the lead lines SIG3 and the lead lines SIG4 are alternately arrayed by plural, lines, for example, 2 by 2 or 3 by 3.

[Seventh Embodiment]

Figure 18:
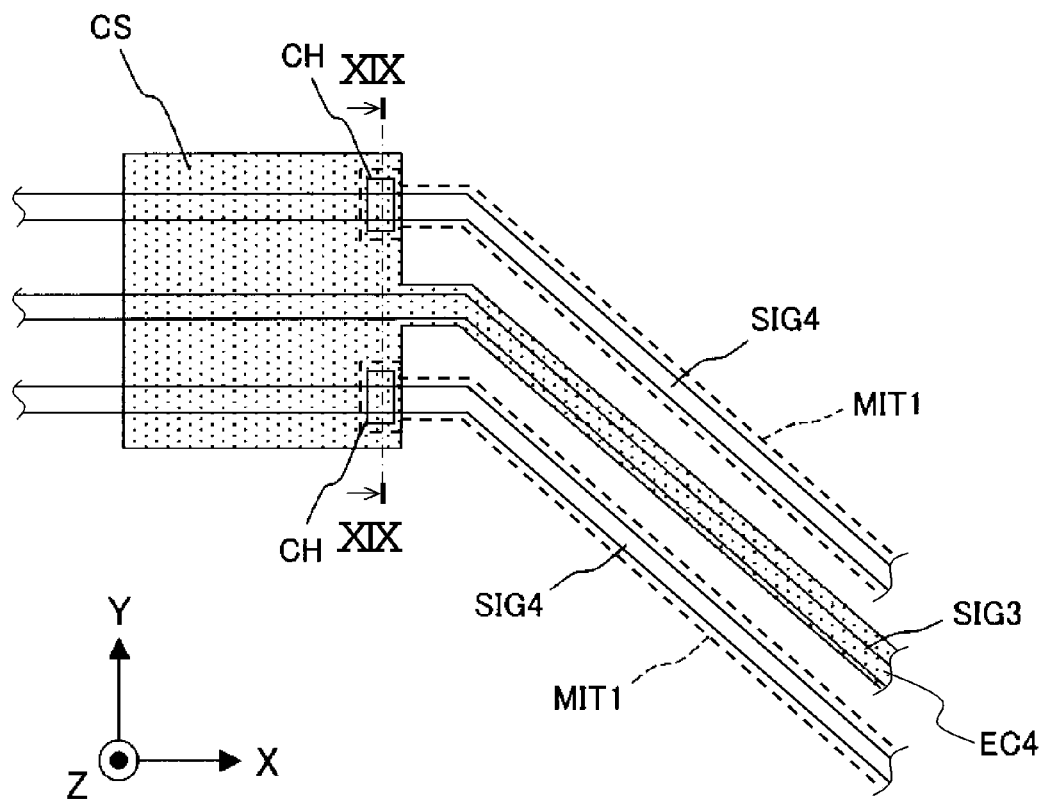
FIG. 18 is an enlarged view of a peripheral portion illustrating a configuration of a liquid crystal display device which is a display device according to a seventh embodiment of the present invention.
Figure 19:
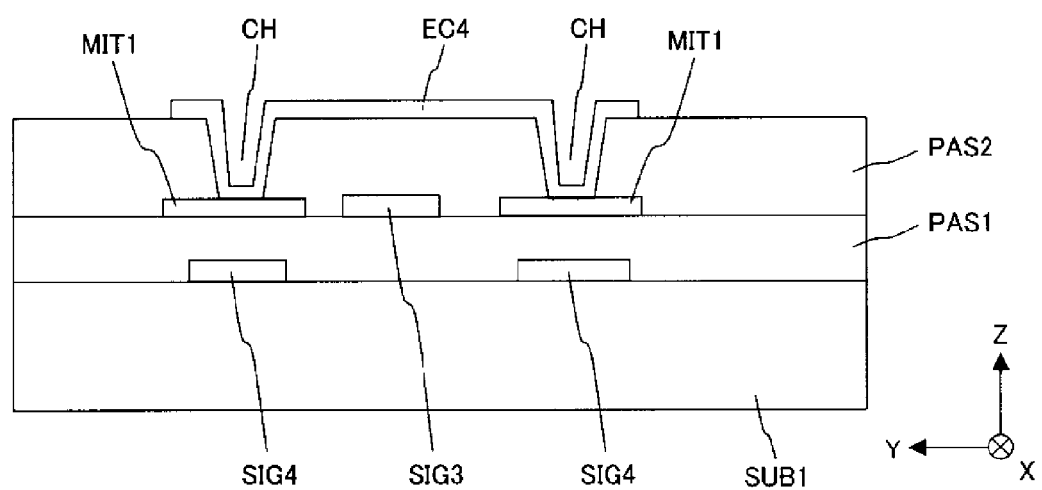
FIG. 19 is a cross-sectional view taken along a line XIX-XIX illustrated in FIG. 18.

FIG. 18 is a diagram illustrating a configuration of a liquid crystal display device which is a display device according to a seventh embodiment of the present invention, and an enlarged view of a peripheral portion in the liquid crystal display device. Also, FIG. 19 is a cross-sectional view taken along a line XIX-XIX illustrated in FIG. 18. The liquid crystal display device according to the seventh embodiment is identical in the configuration with the sixth embodiment except for the conductive film EC4 and conductive films MIT1.

As illustrated in FIG. 19, also in the liquid crystal display device according to the seventh embodiment, the lead lines SIG4 are formed on the upper surface of the first substrate SUB1, and the lead line SIG3 is formed on the upper surface of the insulating film PAS1 formed to cover the lead lines SIG4. In this case, as is apparent from FIG. 18, the lead line SIG3 and the lead lines SIG4 are alternately arrayed when viewed in a plane. Therefore, also in FIG. 19, the lead line SIG3 and the lead lines SIG4 are displaced in the Y-direction.

Also, as illustrated in FIG. 19, the conductive films MIT1 are formed on the upper layer of the insulating film PAS1, and the conductive film MIT1 is formed in the same layer as that of the lead line SIG3. In this case, as illustrated in FIG. 18, the conductive films MIT1 are formed along the lead lines SIG4, and electrically connected to the shield electrode CS through the contact holes CH formed in the insulating film PAS2. Further, the conductive film EC4 extending from the shield electrode CS overlaps with the lead line SIG3. That is, in the configuration of the lead line SIG3 and the lead lines SIG4 according to the seventh embodiment, the conductive film EC4 overlaps with the lead line SIG3 made of a thin film material large in the wiring resistance (sheet resistance). The conductive films MIT1 overlap with the lead lines SIG4 each made of a thin film material smaller in the wiring resistance (sheet resistance) than the thin film material of the lead line SIG3.

In the liquid crystal display device thus configured according to the seventh embodiment, the electrode length of the conductive film EC4 is formed to be smaller than the electrode length of the conductive films MIT1, and the conductive films MIT1 overlap with the respective lead lines SIG4 from one end of the lead lines SIG4 to the other end thereof. Accordingly, the capacitance of the capacitive elements formed by the lead lines SIG4 and the conductive films MIT1 can be made larger than the capacitance of the capacitive element formed by the lead line SIG3 and the conductive film EC4. As a result, the delay time until the scanning signals output from the driver circuit DR arrive at the gate lines through the lead lines SIG4 can be increased. Accordingly, a difference in the delay time between the scanning signals that arrive at the gate lines through the lead line SIG3 larger in the wiring resistance, and the scanning signals that arrive at the gate lines through the lead lines SIG4 smaller in the wiring resistance, that is, a difference in the delay time between the lead line SIG3 and the lead lines SIG4 can be reduced. As a result, the same advantages as those in, the sixth embodiment can be obtained.

In the configuration according to the seventh embodiment, only the conductive films MIT1 overlap with the lead lines SIG4. Alternatively, for example, as with the liquid crystal display device in the second embodiment illustrated in FIG. 9, the conductive films superposed on the lead lines SIG4 may be formed of the conductive films MIT1 and the conductive film in the same layer as that of the shield electrode CS which is electrically connected to the conductive film MIT1.

The invention made by the present inventors has been described in detail on the basis of the embodiments of the invention. However, the present invention is not limited to the above embodiments of the invention, but can be variously modified without departing from the subject matter thereof.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
    a display area in which a plurality of pixels are arrayed and a peripheral area outside of the display area;
    a plurality of scanning signal lines and a plurality of video signal lines, each of the plurality of pixels is configured by an area surrounded by the two adjacent scanning signal lines and the two adjacent video signal lines;
    lead lines formed in the peripheral area and electrically connect the video signal lines or the scanning signal lines with a driver circuit or a terminal portion that receives an output from the driver circuit;
    an insulating film formed on the lead lines and covering the lead lines; and
    a conductive film formed on the insulating film,
    wherein the driver circuit or the terminal portion is arranged in the peripheral area next to the display area in a first direction,
    wherein the lead lines include first lead lines and second lead lines,
    wherein the first lead lines overlap with the conductive film through the insulating film, and the second lead lines do not overlap with the conductive film,
    wherein wiring resistances of the first lead lines between the driver circuit or the terminal portion and the scanning signal lines or the video signal lines are smaller than wiring resistances of the second lead lines between the driver circuit or the terminal portion and the scanning signal lines or the video signal lines,
    wherein the plurality of the first lead lines are connected to the video signal lines or the scanning lines in the peripheral area next to the display area in a second direction perpendicular to the first direction,
    wherein the plurality of the second lead lines are connected to the video signal lines or the scanning signal lines in the peripheral area next to the display area in a third direction opposite to the second direction, and
    wherein the conductive film covers the first lead lines and is provided between the adjacent two first lead lines.

2. The display device according to claim 1, wherein the first lead line is formed to be smaller in the wiring length than the second lead line.

3. The display device according to claim 2, wherein the first lead line and the second lead line are made of the same conductive film material.

4. The display device according to claim 1, wherein a resistance value of the first lead line per unit length is smaller than a resistance value of the second lead line per unit length.

5. The display device according to claim 4, wherein the first lead line and the second lead line are formed in different layers.

6. The display device according to claim 1 wherein the conductive film is formed in the vicinity of the display area, and extends from a transparent conductive film that prevents an electric field from being leaked to an external.

7. The display device according to claim 1, wherein the insulating film includes a first insulating film that is formed in contact with surfaces of at least the lead lines, and a second insulating film that is formed in an upper layer of the first insulating film, and
    wherein the conductive film includes a first conductive film that is opposed to the first lead line through the first insulating film, and a second conductive film that is formed in an upper layer of the second insulating film, and electrically connected to the first conductive film through a through-hole formed in the second insulating film.

8. The display device according to claim 7, wherein the second conductive film is formed in the vicinity of the display area, and extends from a shield conductive film that prevents an electric field from being leaked to an external.

9. A display device according to claim 1, further comprising:
a liquid crystal display panel including a first substrate on which the scanning signal lines and the video signal lines are formed, and a second substrate that is opposed to the first substrate through a liquid crystal layer; and
a backlight device that is arranged on a rear surface of the liquid crystal display panel, and delivers a backlight.

10. A display device according to claim 1,
wherein the first lead line and the second lead line are electrically connected to the scanning signal line,
wherein the wiring resistance of the first lead line between the driver circuit or the terminal portion and the scanning signal line is smaller than the wiring resistance of the second lead line between the driver circuit or the terminal portion and the scanning signal line.

11. A display device according to claim 1,
wherein the first lead line and the second lead line are electrically connected to the video signal line,
wherein the wiring resistance of the first lead line between the driver circuit or the terminal portion and the video signal line is smaller than the wiring resistance of the second lead line between the driver circuit or the terminal portion and the video signal line.

12. The display device according to claim 1,
wherein the first lead lines have portions overlapped with the conductive film, the portions varying in length.

13. The display device according to claim 1,
wherein the conductive film is a transparent conductive film.

14. The display device according to claim 12,
wherein one of the first lead lines with a smaller wiring resistance, between the driver circuit or the terminal portion and the scanning signal lines or the video signal lines, is longer than another of the first lead lines, in the length of the portions overlapped with the conductive film.

* * * * *